(12) United States Patent
Khandpur et al.

(10) Patent No.: US 6,630,531 B1
(45) Date of Patent: Oct. 7, 2003

(54) ADHESIVE FOR BONDING TO LOW SURFACE ENERGY SURFACES

(75) Inventors: Ashish K. Khandpur, Roseville, MN (US); Jingjing Ma, Woodbury, MN (US); Mark D. Gehlsen, Eagan, MN (US); Bradley S. Momchilovich, Stillwater, MN (US); John J. Stradinger, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/496,831

(22) Filed: Feb. 2, 2000

(51) Int. Cl.[7] .................... C09J 153/02; C08L 53/02
(52) U.S. Cl. ................. 524/505; 524/575; 525/314; 525/98
(58) Field of Search .................. 524/505, 575; 525/314, 98

(56) References Cited

U.S. PATENT DOCUMENTS

| | | |
|---|---|---|
| 2,866,722 A | 12/1958 | Gensel et al. |
| 2,956,904 A | 10/1960 | Hendricks |
| 3,239,478 A | 3/1966 | Harlan |
| 3,280,084 A | 10/1966 | Zelinski et al. |
| 3,519,585 A | 7/1970 | Miller |
| 3,565,247 A | 2/1971 | Brochman |
| 3,615,972 A | 10/1971 | Morehouse et al. |
| 3,639,517 A | 2/1972 | Kitchen et al. |
| 3,864,181 A | 2/1975 | Wolinski et al. |
| 3,932,328 A | 1/1976 | Korpman |
| 3,939,112 A | 2/1976 | Needham |
| 3,985,830 A | 10/1976 | Fetters et al. |
| 4,086,298 A | 4/1978 | Fahrbach et al. |
| 4,091,053 A | 5/1978 | Kitchen |
| 4,092,375 A | 5/1978 | Vreugdenhil |
| 4,133,731 A | 1/1979 | Hansen et al. |
| 4,148,771 A | 4/1979 | Nash |
| 4,221,884 A | 9/1980 | Bi et al. |
| 4,223,067 A | 9/1980 | Levens |
| 4,287,308 A | 9/1981 | Nakayama et al. |
| 4,391,949 A | 7/1983 | St. Clair |
| 4,415,615 A | 11/1983 | Esmay et al. |
| 4,444,953 A | 4/1984 | St. Clair |
| 4,556,464 A | 12/1985 | St. Clair |
| 4,618,525 A | 10/1986 | Chamberlain et al. |
| 4,699,938 A | 10/1987 | Minamizaki et al. |
| 4,704,434 A | 11/1987 | Kitchen et al. |
| 4,704,435 A | 11/1987 | Kitchen |
| 4,710,536 A | 12/1987 | Klingen et al. |
| 4,749,590 A | 6/1988 | Klingen et al. |
| 4,780,367 A | 10/1988 | Lau et al. |
| 4,818,610 A | 4/1989 | Zimmerman et al. |
| 4,855,170 A | 8/1989 | Darvell et al. |
| 4,861,635 A | 8/1989 | Carpenter et al. |
| 4,906,421 A | 3/1990 | Plamthottam et al. |
| 4,921,739 A | 5/1990 | Cascino |
| 4,950,537 A | 8/1990 | Vesley et al. |
| 4,960,802 A | 10/1990 | DiStefano |
| 5,024,880 A | 6/1991 | Veasley et al. |
| 5,037,411 A | 8/1991 | Malcolm et al. |
| 5,079,090 A | 1/1992 | Joseph et al. |
| 5,086,088 A | 2/1992 | Kitano et al. |
| 5,100,728 A | 3/1992 | Plamthottam et al. |
| 5,104,921 A | 4/1992 | Erickson et al. |
| 5,115,103 A | 5/1992 | Yamanishi et al. |
| 5,151,327 A | 9/1992 | Nishiyama et al. |
| 5,234,757 A | 8/1993 | Wong |
| 5,270,396 A | 12/1993 | Farrar, et al. |
| 5,296,547 A * | 3/1994 | Nestegard et al. .......... 525/314 |
| 5,342,858 A | 8/1994 | Litchholt et al. |
| 5,393,787 A * | 2/1995 | Nestegard et al. .......... 524/575 |
| 5,441,810 A | 8/1995 | Aizawa et al. |
| 5,476,712 A | 12/1995 | Hartman et al. |
| 5,605,717 A | 2/1997 | Simmons et al. |
| 5,609,954 A | 3/1997 | Aizawa et al. |
| 5,650,215 A | 7/1997 | Mazurek et al. |
| 5,693,425 A | 12/1997 | Ma et al. .................... 428/483 |
| 5,773,506 A * | 6/1998 | Nestegard et al. .......... 524/505 |
| 5,777,039 A | 7/1998 | De Craene et al. ......... 525/314 |
| 5,804,610 A | 9/1998 | Hamer et al. ............... 522/182 |
| 5,897,930 A | 4/1999 | Calhoun et al. |

FOREIGN PATENT DOCUMENTS

| | | |
|---|---|---|
| CA | 747341 | 11/1966 |
| DE | 195 27 926 A1 | 7/1995 |
| DE | 195 31 631 | 3/1997 |
| DE | 197 30 854 A1 | 1/1999 |
| EP | 0 197 774 B1 | 10/1986 |
| EP | 0 206 760 | 12/1986 |
| EP | 0 084 220 | 1/1987 |
| EP | 0 222 680 | 5/1987 |
| EP | 0 316 601 | 5/1989 |
| EP | 0 324 242 | 7/1989 |
| EP | 0 349 216 | 1/1990 |
| EP | 0 567 837 | 11/1993 |

(List continued on next page.)

OTHER PUBLICATIONS

Abstract Japan 08067861, Mar. 12, 1996.

Cobbs, W., "Foaming of Hot Melts", pp. 103–115.

D. Klempehr and K.C.Frisch, Handbook of Polymeric Foams and Foam Technology, pp. 229–233, 1991, Hanser Pub., New York, NY.

*Primary Examiner*—Peter Szekely
(74) *Attorney, Agent, or Firm*—Jean A. Lown

(57) ABSTRACT

A novel polymodal asymmetric elastomeric block copolymer and a pressure sensitive adhesive, tape and adhesive backed article made therefrom, such as a polymer foam article having a substantially smooth surface prepared by melt-mixing a polymer composition and a plurality of microspheres, at least one of which is an expandable polymeric microsphere, under process conditions, including temperature and shear rate, selected to form an expandable extrudable composition; and extruding the composition through a die.

25 Claims, 13 Drawing Sheets

FOREIGN PATENT DOCUMENTS

| | | |
|---|---|---|
| EP | 0 575 012 | 12/1993 |
| EP | 0 706 547 | 4/1996 |
| EP | 0 710 696 | 5/1996 |
| EP | 0 717 091 | 6/1996 |
| EP | 0 763 585 | 9/1996 |
| JP | 52-129795 | 4/1976 |
| JP | SHO 60 1985 76583 | 1/1985 |
| JP | 4-246488 | 1/1991 |
| JP | HEI 5 1993 194921 | 8/1993 |
| WO | WO 93/07228 | 4/1993 |
| WO | WO94/17115 | 8/1994 |
| WO | WO 95/16754 | 6/1995 |
| WO | WO 95/25774 | 9/1995 |
| WO | WO 96/14366 | 5/1996 |
| WO | WO 96/38285 | 12/1996 |
| WO | WO 00/06637 | 7/1998 |
| WO | WO 99/03943 | 1/1999 |
| WO | WO 98/29516 | 10/2000 |

* cited by examiner

ADHESIVE FOR BONDING TO LOW SURFACE ENERGY SURFACES

FIELD OF THE INVENTION

The present invention relates to an adhesive made from a polymodal asymmetric elastomeric block copolymer, more particularly, to such an adhesive for forming high strength bonds to low surface energy surfaces and, even more particularly, to articles made with such adhesives, including adhesive tapes.

BACKGROUND OF THE INVENTION

Block copolymers are known in the art for a variety of applications including for use in removable tape applications wherein the tape is typically removed when it is no longer needed. See, for example, U.S. Pat. Nos. 5,393,787 and 5,296,547, both of which are assigned to the present assignee. Such block copolymers can be formulated into a pressure sensitive adhesive, which may be used to make a variety of different types of tapes including removeable tapes. Specific examples of the various tapes which may be made include masking tapes, packaging tapes, medical tapes and autoclave indicator tapes. Additionally, the pressure sensitive adhesive may be used to make protective sheeting, labels, and facestock.

Articles incorporating a polymer foam core are known. The foam includes a polymer matrix and is characterized by a density that is lower than the density of the polymer matrix itself. Density reduction is achieved in a number of ways, including through creation of gas-filled voids in the matrix (e.g., by means of a blowing agent) or inclusion of polymeric microspheres (e.g., expandable microspheres) or non-polymeric microspheres (e.g., glass microspheres).

SUMMARY OF THE INVENTION

The adhesives of the present invention are particularly useful for forming strong bonds to low surface energy substrates. As used herein, low surface energy substrates are those having a surface energy of less than about 45 dynes per centimeter, more typically less than about 40 dynes per centimeter, and most typically less than about 35 dynes per centimeter.

In one aspect of the invention, a pressure sensitive adhesive is provided that comprises 100 parts by weight of a polymodal asymmetric elastomeric block copolymer and at least one tackifier or tackifying resin in an amount sufficient to raise the calculated Fox $T_g$ of the rubber phase of the adhesive to greater than 245° K. The amount of tackifier used depends on the resulting $T_g$, of the adhesive's rubber phase, that is obtained by the addition of the tackifier. So, more tackifier can be added to obtain the $T_g$ desired. The adhesive composition may also include 0 to about 50 parts by weight of a crosslinking agent and 0 to about 300 parts by weight of a plasticizer. In general, the difference between a tackifier and a plasticizer is that the addition of a tackifier increases the $T_g$ of the adhesive's rubber phase while the addition of the plasticizer decreases the $T_g$ of the adhesive's rubber phase. The polymodal asymmetric elastomeric block copolymer has the formula $Q_nY$ and comprises from about 4 to about 40 percent by weight of a polymerized monovinyl aromatic compound and from about 96 to about 60 percent by weight of polymerized conjugated diene. Q represents an individual arm of the block copolymer and has the formula S-B; n represents the number of arms Q in the block copolymer and is a whole number of at least 3; and Y is the residue of a multifunctional coupling agent. S is a nonelastomeric polymer segment endblock of a polymerized monovinyl aromatic homopolymer, there being at least two different molecular weight endblocks in the copolymer, a higher molecular weight endblock and a lower molecular weight endblock. The number average molecular weight of the higher molecular weight endblock $(Mn)_H$ is in the range of from about 5,000 to about 50,000. The number average molecular weight of the lower molecular weight endblock $(Mn)_L$ is in the range of from about 1,000 to about 10,000. The ratio $(Mn)_H/(Mn)_L$ is at least 1.25. B is an elastomeric polymer segment midblock which connects each arm to the residue of a multifunctional coupling agent (Y) and comprises a polymerized conjugated diene or combination of conjugated dienes.

The adhesive has a rubber phase exhibiting a calculated Fox $T_g$ of greater than 245° K, and the adhesive forms a high strength bond to low surface energy surfaces. As used herein, low surface energy surfaces or substrates exhibit a surface energy of less than 45 dyne/cm, more typically less than 40 dyne/cm, or more typically less than 35 dyne/cm. Preferably, the rubber phase of the adhesive has a calculated Fox $T_g$ of at least 250° K and, more preferably, 255° K. In addition, the rubber phase of the adhesive preferably has a calculated Fox $T_g$ with an upper limit of less than 300° K and, more preferably, an upper limit of 285° K. In general, the ability of the present inventive adhesive to bond to low surface energy surfaces increases as the $T_g$ of the rubber phase increases. The $T_g$ of the rubber phase is dependent on the weight fraction (i.e., concentration) and the $T_g$ of each of the various components of the adhesive, as well as the weight fraction and $T_g$ of the rubber portion of the copolymer.

The present inventive adhesive can exhibit a 180° peel strength on a low surface energy substrate (e.g., high density polyethylene, or HDPE) of at least about 20 Newtons per decimeter (N/dm), preferably, at least about 60 N/dm, more preferably at least about 80 N/dm, and most preferably at least about 100 N/dm, for example, when the adhesive has a thickness of about 5 mil (125 μm) and is, for example, in the form of a film (e.g., a transfer tape).

The present adhesive can be used in combination with a backing (e.g., a foam core, a vinyl strip or sheet, etc.) having first and second major surfaces, with the adhesive coated on at least a portion of at least one of the major surfaces. The backing can include a release surface (e.g., for a tape roll). The backing can also be a foam tape core made of the same or a different polymodal asymmetric elastomeric block copolymer, and the adhesive can be in the form of at least one co-extruded layer on the foam tape core. The backing can also be an acrylic foam tape core and the adhesive in the form of at least one co-extruded layer on the foam tape core. The backing can be in the form of a foam, with at least one of its major surfaces being substantially smooth, having an Ra value less than about 75 micrometers, as measured by laser triangulation profilometry, and comprising a plurality of microspheres, at least one and preferably a plurality of which are expandable polymeric microspheres. Typically, this foam is substantially free of broken polymeric microspheres. The present adhesive can also be used in combination with at least one other polymer composition in the form of a plurality of discrete structures bonded to or embedded in the foam.

The present adhesive can exhibit a 90° peel strength on a low surface energy substrate (e.g., HDPE) of at least about 50 N/dm, preferably, at least about 75 N/dm, more preferably at least about 100 N/dm and most preferably at least about 150 N/dm, for example, when the adhesive has a thickness of about 3 mil (75 μm) to about 5 mil (125 μm) and is, for example, in the form of an adhesive skin laminated onto, or co-extruded with, an adhesive or non-adhesive foam tape core having a thickness of about 1 mm. In general, the thicker the adhesive, with or without a foam core, the higher the bond strength exhibited by the adhesive, up to a limit, such as the cohesive strength of the foam.

Preferably, the tackifier used in the present adhesive is a low acidic or neutral tackifier. As used herein, a low acidic or neutral tackifier is one with an acid number of about 1 mg KOH/g or less, as tested according to Exxon Chemical Co. analytical method specification AMS 360.25. In addition, the tackifier preferably has a $T_g$, as measured by differential scanning calorimeter (DSC), in the range of from about −50° C. to about 200° C. and, more preferably, from about −30° C. to about 150° C. The $T_g$ of the adhesive's rubber phase is dependent, in significant part, on the $T_g$ of the tackifier. In general, for a given weight of tackifier, as the $T_g$ of the tackifier increases, the $T_g$ of the adhesive increases. It is also preferable for the tackifier to have a softening point of above 80° C., and more preferably of 90° C. or higher. Preferably, the present adhesive comprises at least one tackifier selected from the group consisting of hydrogenated mixed aromatic tackifiers, aliphatic/aromatic hydrocarbon liquid tackifiers; naphthenic oils, mineral oils, and a mixture of one or more thereof. It can be desirable for the adhesive to comprise in the range of from about 50 parts to about 350 parts, preferably, from about 70 parts to about 300 parts and, more preferably, from about 90 parts to about 265 parts by weight of one or more tackifiers.

The present adhesive can be a radiation crosslinkable composition such as, for example, by electron beam radiation, ultraviolet radiation, etc., so as to produce a crosslinked polymodal asymmetric elastomeric block copolymer.

In an aspect of the invention, an article is provided that includes a polymer foam having a substantially smooth surface. The foam may be provided in a variety of shapes, including a rod, a cylinder, a sheet, etc. In some embodiments, e.g., where the foam is provided in the form of a sheet, the foam has a pair of major surfaces, one or both of which are substantially smooth. The foam includes a plurality of microspheres, at least one of which is an expandable polymeric microsphere.

As used herein, a "polymer foam" refers to an article that includes a polymer matrix in which the density of the article is less than the density of the polymer matrix alone.

A "substantially smooth" surface refers to a surface having an Ra value less than about 75 micrometers, as measured by laser triangulation profilometry according to the procedure described in the Examples, infra. Preferably, the surface has an Ra value less than about 50 micrometers, more preferably less than about 25 micrometers. The surface is also characterized by the substantial absence of visually observable macroscopic defects such as wrinkles, corrugations and creases. In addition, in the case of an adhesive surface, the surface is sufficiently smooth such that it exhibits adequate contact and, thereby, adhesion to a substrate of interest. The desired threshold level of adhesion will depend on the particular application for which the article is being used.

An "expandable polymeric microsphere" is a microsphere that includes a polymer shell and a core material in the form of a gas, liquid, or combination thereof, that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The article is a pressure sensitive adhesive article when the article has a surface available for bonding that is either tacky at room temperature (i.e., pressure sensitive adhesive articles) or becomes tacky after being heated (i.e., heat-activated adhesive articles). An example of an adhesive article is a foam that itself is an adhesive, or an article that includes one or more separate adhesive compositions bonded to the foam, e.g., in the form of a continuous layer or discrete structures (e.g., stripes, rods, filament, etc.), in which case the foam itself need not be an adhesive. Examples of non-adhesive articles include non-adhesive foams and adhesive foams provided with a non-adhesive composition, e.g., in the form of a layer, substrate, etc., on all surfaces available for bonding.

The foam can be substantially free of urethane crosslinks and urea crosslinks, thus eliminating the need for isocyanates in the composition. An example of such a material for the polymer foam is an acrylic polymer or copolymer. In some cases, e.g., where high cohesive strength and/or high modulus is needed, the foam may be crosslinked.

The polymer foam preferably includes a plurality of expandable polymeric microspheres. The foam may also include one or more non-expandable microspheres, which may be polymeric or non-polymeric microspheres (e.g., glass microspheres).

Examples of preferred expandable polymeric microspheres include those in which the shell is essentially free of vinylidene chloride units. Preferred core materials are materials other than air that expand upon heating.

The foam may contain agents in addition to microspheres, the choice of which is dictated by the properties needed for the intended application of the article. Examples of suitable agents include those selected from the group consisting of tackifiers, plasticizers, pigments, dyes, solid fillers, and combinations thereof. The foam may also include gas-filled voids in the polymer matrix. Such voids typically are formed by including a blowing agent in the polymer matrix material and then activating the blowing agent, e.g., by exposing the polymer matrix material to heat or radiation.

The properties of the article may be adjusted by bonding and/or co-extruding one or more polymer compositions (e.g., in the form of continuous layers or discrete structures such as stripes, rods, filament, etc.) to or into the foam. Both foamed and non-foamed compositions may be used. A composition may be bonded directly to the foam or indirectly, e.g., through a separate adhesive.

The article may be used as a "foam-in-place" article. The term foam-in-place refers to the ability of the article to be expanded or further expanded after the article has been placed at a desired location. Such articles are sized and placed in a recessed area or on an open surface, and then exposed to heat energy (e.g., infrared, ultrasound, microwave, resistive, induction, convection, etc.) to activate, or further activate, the expandable microspheres or blowing agent. Such recessed areas can include a space between two or more surfaces (e.g., parallel or non-parallel surfaces) such as found, for example, between two or more opposing and spaced apart substrates, a through hole or a cavity. Such open surfaces can include a flat or uneven surface on which it is desirable for the article to expand after being applied to the surface. Upon activation, the foam expands due to the expansion of the microspheres and/or blowing agent, thereby partially or completely filling the recess or space, or thereby increasing the volume (e.g. height) of the article above the open surface.

It can be desirable for the foam to comprise a substantially uncrosslinked or thermoplastic polymeric matrix material. It can also be desirable for the matrix polymer of the foam to exhibit some degree of crosslinking. Any crosslinking should not significantly inhibit or prevent the foam from expanding to the degree desired. One potential advantage to such crosslinking is that the foam will likely exhibit improved mechanical properties (e.g., increased cohesive strength) compared to the same foam with less or no crosslinking. In the case of foams having a curable polymer matrix, exposure to heat can also initiate cure of the matrix.

It can further be desirable for the foam-in-place article to comprise multiple layers, discrete structures or a combination thereof (See, for example, FIGS. 4–6 and the below discussion thereof), with each layer and discrete structure having a difference in the way it foams-in-place (e.g., using expandable microspheres, blowing agents or a combination thereof), a difference in the degree to which it can be expanded in place, or a combination thereof. For example, the concentration of expandable microspheres and/or blowing agents can be different, the type of expandable microspheres and/or blowing agents can be different, or a combination thereof can be used. In addition, for example, one or more of the layers and discrete structures can be expandable in place while one or more other layers and discrete structures can be unexpandable in place.

In yet another aspect of the invention, an article (e.g., an adhesive article, as defined above) is provided that comprises a polymer foam (as defined above) that includes: (a) a plurality of microspheres, at least one of which is an expandable polymeric microsphere (as defined above), and (b) a polymer matrix that is substantially free of urethane crosslinks and urea crosslinks. The matrix can include a blend of two or more polymers in which at least one of the polymers in the blend is a pressure sensitive adhesive polymer (i.e., a polymer that is inherently pressure sensitive, as opposed to a polymer which must be combined with a tackifier in order to form a pressure sensitive composition) and at least one of the polymers is selected from the group consisting of unsaturated thermoplastic elastomers, acrylate-insoluble saturated thermoplastic elastomers, and non-pressure sensitive adhesive thermoplastic polymers.

The foam preferably has a substantially smooth surface (as defined above). In some embodiments, the foam has a pair of major surfaces, one or both of which may be substantially smooth. The foam itself may be an adhesive. The article may also include one or more separate adhesive compositions bonded to the foam, e.g., in the form of a layer. If desired, the foam may be crosslinked.

The polymer foam preferably includes a plurality of expandable polymeric microspheres. It may also include non-expandable microspheres, which may be polymeric or non-polymeric microspheres (e.g., glass microspheres). The properties of the article may be adjusted by directly or indirectly bonding one or more foamed or non-foamed polymer compositions to the foam.

The invention also features multi-layer articles that include the above-described foam articles provided on a major surface of a first substrate, or sandwiched between a pair of substrates. Examples of suitable substrates include wood substrates, synthetic polymer substrates, and metal substrates (e.g., metal foils).

In yet a further aspect of the invention, a method is provided for preparing an article, where the method includes: (a) melt mixing a polymer composition and a plurality of microspheres, one or more of which is an expandable polymeric microsphere (as defined above), under process conditions, including temperature, pressure and shear rate, selected to form an expandable extrudable composition; (b) extruding the composition through a die to form a polymer foam (as defined above); and (c) at least partially expanding one or more expandable polymeric microspheres before the polymer composition exits the die. It can be preferable for most, if not all, of the expandable microspheres to be at least partially expanded before the polymer composition exits the die. By causing expansion of the expandable polymeric microspheres before the composition exits the die, the resulting extruded foam can be produced to within tighter tolerances, as described below in the Detailed Description.

It is desirable for the polymer composition to be substantially solvent-free. That is, it is preferred that the polymer composition contain less than 20 wt. % solvent, more preferably, contain substantially none to no greater than about 10 wt. % solvent and, even more preferably, contain no greater than about 5 wt. % solvent.

In an additional aspect of the invention, another method is provided for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above). After the polymer foam exits the die, enough of the expandable polymeric microspheres in the foam remain unexpanded or, at most, partially expanded to enable the polymer foam to be used in a foam-in-place application. That is, the extruded foam can still be further expanded to a substantial degree at some later time in the application. Preferably, the expandable microspheres in the extruded foam retain most, if not all, of their expandability.

In another aspect of the invention, another method is provided for preparing an article that includes: (a) melt mixing a polymer composition and a plurality of microspheres, one or more of which is an expandable polymeric microsphere (as defined above), under process conditions, including temperature, pressure and shear rate, selected to form an expandable extrudable composition; and (b) extruding the composition through a die to form a polymer foam (as defined above) having a substantially smooth surface (as defined above). It is also possible to prepare foams having a pair of major surfaces in which one or both major surfaces are substantially smooth.

Polymers used according to the present invention can preferably possess a weight average molecular weight of at least about 10,000 g/mol, and more preferably at least about 50,000 g/mol. It can also be preferable for the polymers used according to the present invention to exhibit shear viscosities measured at a temperature of 175° C. and a shear rate of 100 sec$^{-1}$, of at least about 30 Pascal-seconds (Pa-s), more preferably at least about 100 Pa-s and even more preferably at least about 200 Pa-s.

The article may be an adhesive article (as defined above), e.g., a pressure sensitive adhesive article or a heat-activated adhesive article. In some embodiments, the foam itself is an adhesive.

Both the expandable extrudable composition and the extruded foam preferably include a plurality of expandable polymeric microspheres (as defined above). The extruded foam and the expandable extrudable composition may also include one or more non-expandable microspheres, which may be polymeric or non-polymeric microspheres (e.g., glass microspheres).

The expandable extrudable composition may be co-extruded with one or more additional extrudable polymer compositions, e.g., to form a polymer layer on a surface of the resulting foam. For example, the additional extrudable polymer composition may be an adhesive composition. Other suitable additional extrudable polymer compositions include additional microsphere-containing compositions.

The method may also include crosslinking the foam. For example, the foam may be exposed to thermal, actinic, or ionizing radiation or combinations thereof subsequent to extrusion to crosslink the foam. Crosslinking may also be accomplished by using chemical crosslinking methods based on ionic interactions.

The invention provides foam-containing articles, and a process for preparing such articles, in which the articles can be designed to exhibit a wide range of properties depending upon the ultimate application for which the article is intended. For example, the foam core may be produced alone or in combination with one or more polymer compositions, e.g., in the form of layers to form multi-layer articles. The ability to combine the foam with additional polymer compositions offers significant design flexibility, as a variety of different polymer compositions may be used, including adhesive compositions, additional foam compositions, removable compositions, layers having different mechanical properties, etc. In addition, through careful control of the foaming operation it is possible to produce a foam having a pattern of regions having different densities.

Both thin and thick foams can be produced. In addition, both adhesive and non-adhesive foams can be produced. In the latter case, the foam may be combined with one or more separate adhesive compositions to form an adhesive article. In addition, it is possible to prepare foams from a number of different polymer matrices, including polymer matrices that are incompatible with foam preparation processes that rely on actinic radiation-induced polymerization of microsphere-containing photopolymerizable compositions. Examples of such polymer matrix compositions include unsaturated thermoplastic elastomers and acrylate-insoluble saturated thermoplastic elastomers. Similarly, it is possible to include additives such as ultraviolet-absorbing pigments (e.g., black pigments), dyes, and tackifiers that could not be used effectively in actinic radiation-based foam processes. It is further possible, in contrast to solvent-based and actinic radiation-based foam processes, to prepare foams having a substantially homogeneous distribution of microspheres. In addition, the present expanded foam (i.e., a foam containing microspheres that have been at least partially expanded) can have a uniform size distribution of the expanded microspheres from the surface to the center of the foam. That is, there is no gradient of expanded microsphere sizes from the surface to the center of the foam, e.g., like that found in expanded foams which are made in a press or a mold. Expanded foams that exhibit such a size distribution gradient of their expanded microspheres can exhibit weaker mechanical properties than foams that have a uniform size distribution of the expanded microspheres. Oven foaming of these foam compositions requires long residence times in the high temperature oven due to the poor thermal conductivity of the foams. Long residence times at high temperatures can lead to polymer and carrier (e.g., release liner) degradation. In addition, poor heat transfer can also lead to foams containing non-uniform expansion, causing a density gradient. Such a density gradient can significantly decrease the strength and otherwise detrimentally impact the properties of the foam. The process associated with oven foaming is also complicated and usually requires unique process equipment to eliminate large scale corrugation and buckling of the planar sheet. For a reference on oven foaming see, for example, *Handbook of Polymeric Foams & Foam Technology*, eds: D. Klempner & K. C. Frisch, Hanser Publishers, New York, N.Y., 1991.

Foams with a substantially smooth surface can be produced in a single step. Accordingly, it is not necessary to bond additional layers to the foam in order to achieve a smooth-surfaced article. Substantially smooth-surfaced foams are desirable for a number of reasons. For example, when the foam is laminated to another substrate, the substantially smooth surface minimizes air entrapment between the foam and the substrate. Moreover, in the case of adhesive foams the substantially smooth surface maximizes contact with a substrate to which the foam is applied, leading to good adhesion.

The extrusion process enables the preparation of multi-layer articles, or articles with discrete structures, in a single step. In addition, when foaming occurs during the extrusion, it is possible, if desired, to eliminate separate post-production foaming processes. Moreover, by manipulating the design of the extrusion die (i.e., the shape of the die opening), it is possible to produce foams having a variety of shapes.

In addition, the present method may include heating the article after extrusion to cause further expansion. The additional expansion may be due to microsphere expansion, activation of a blowing agent, or a combination thereof.

It is also possible to prepare "foam-in-place" articles by controlling the process temperature during the initial foam preparation such that expansion of the microspheres is minimized or suppressed. The article can then be placed at a location of use or application, (e.g., in a recessed area or on an open surface) and heated, or exposed to an elevated temperature to cause microsphere expansion. "Foam-in-place" articles can also be prepared by including a blowing agent in the expandable extrudable composition and conducting the extrusion process under conditions insufficient to activate the blowing agent. Subsequent to foam preparation, the blowing agent can be activated to cause additional foaming.

Other features and advantages of the invention will be apparent from the following description of the preferred embodiments thereof, and from the claims.

BRIEF DESCRIPTION OF THE DRAWINGS

FIG. 1(*b*) is a photomicrograph obtained by scanning electron microscopy (SEM) of the surface of the sample described in Example 12.

FIG. 2(*b*) is a SEM photomicrograph of the surface of the sample described in Example 58.

DETAILED DESCRIPTION

Figure 1A:
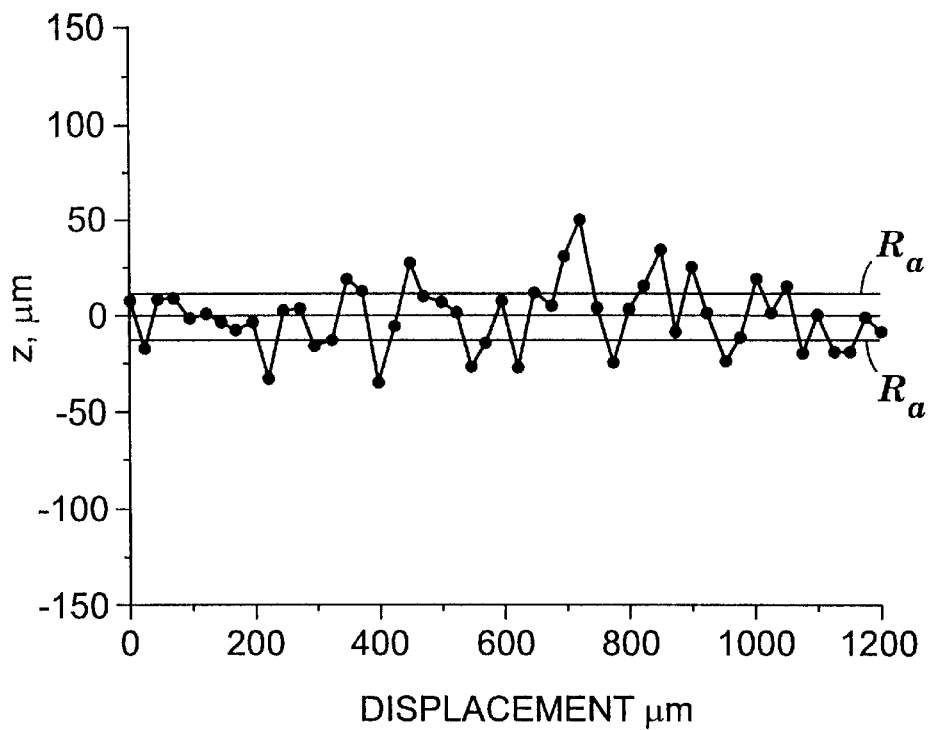
FIG. 1(*a*) is a plot showing the Ra value obtained by laser triangulation profilometry for the sample described in Example 12.

The adhesives of the invention are particularly useful for adhering to low surface energy substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and polymethylmethacrylate. Other substrates may also have properties of low surface energy due to a residue, such as an oil residue or a film such as a paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics (e.g., glass), metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desireable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion).

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a polyacrylic adhesive, or it can be the same adhesive as the invention, with the same or a different formulation. Double coated tapes are typically carried on a release liner.

Additionally, the present adhesive compositions can be formed into foams by conventional techniques or, preferably, in accordance with the methods disclosed in PCT Patent Application No. PCT/US99/17344, having an international filing date of Jul. 30, 1999 and a priority date of Jul. 31, 1998, entitled ARTICLES THAT INCLUDE A POLYMER FOAM AND METHOD FOR PREPARING SAME, and which is incorporated herein by reference in its entirety. Preferred embodiments of such foams and the method of making them are described below and illustrated in the drawings. In one preferred embodiment, the adhesive of the present invention is adhered to one or both surfaces of a polymer foam made in accordance with the methods disclosed in PCT Patent Application No. PCT/US99/17344.

The pressure-sensitive adhesive compositions of the present invention can be made using methods known in the art. They can be made by dissolving the block copolymer, suitable tackifier(s), any plasticizer(s), and any other additives in a suitable solvent, and coating onto a substrate (e.g., release liner, tape backing, panel) using conventional means (e.g., knife coating, roll coating, gravure coating, rod coating, curtain coating, spray coating, air knife coating). In a preferred embodiment, the pressure-sensitive adhesive is prepared in a solvent free process (i.e., is substantially solvent-free). That is, it is preferred that the adhesive contain less than 20 wt. % solvent, more preferably, contain substantially none to no greater than about 10 wt. % solvent and, even more preferably, contain no greater than about 5 wt. % solvent. These processes are known and include compounding by calendering or roll milling, and extruding (e.g., single. screw, twin screw, disk screw, reciprocating single screw, pin barrel single screw, etc.). Commercially available equipment such as BRABENDER™ or BANBURY™ internal mixers are also available to batch mix the adhesive compositions. After compounding, the adhesive may be coated through a die into a desired form, such as a layer of adhesive, or it may be collected for forming at a later time.

The copolymers useful in making the pressure-sensitive adhesives of the invention are disclosed in U.S. Pat. No. 5,296,547, incorporated by reference in its entirety herein. The copolymers are polymodal asymmetric elastomeric block copolymers formed by anionic polymerization. After a copolymer is formed, it may be formed into small pellets with conventional equipment to facilitate handling of the copolymer.

As used herein, a tackifier is one that typically has a higher $T_g$ than the rubber phase $T_g$ of the particular polymodal asymmetric elastomeric block copolymer being used and the addition of the tackifier increases the $T_g$ of the rubber phase of the adhesive composition. In addition, as used herein, a plasticizer is one that typically has a lower $T_g$ than the rubber phase $T_g$ of the particular polymodal asymmetric elastomeric block copolymer being used and the addition of the plasticizer decreases the $T_g$ of the rubber phase of the adhesive composition.

In one embodiment of the invention, the copolymer is compounded with conventional tackifying resins and/or plasticizers in amounts sufficient to produce a pressure-sensitive adhesive so that the rubber phase of the resulting pressure-sensitive adhesive has a calculated Fox equation glass transition temperature ($T_g$) of greater than about 245° K (Kelvin), preferably greater than about 250° K, and more preferably greater than about 255° K, and less than about 300° K, and preferably less than about 285° K. Pressure-sensitive adhesives meeting these requirements are found to have the high adhesion to low energy surfaces such as polyethylenes and polypropylene. In calculating the glass transition temperature, it is assumed that all of the added tackifier(s) go into the rubbery phase and are miscible within it. The glass transition temperature, $T_g$ in degrees Kelvin (° K), of the resulting pressure-sensitive adhesive is calculated according to the Fox equation shown below:

$$1/T_g = w_c/T_{g,c} + w_s/T_{g,s} + w_1/T_{g,1}$$

wherein $T_{g,c}$, $T_{g,s}$, and $T_{g,1}$ represent the glass transition temperature of the rubbery phase in the copolymer, the solid tackifier, and the liquid tackifier, respectively, and $w_c$, $w_s$, and $w_1$ represent the weight fractions of the rubbery phase of the copolymer, solid tackifier, and liquid tackifier, respectively, in the adhesive. As used herein, the term liquid tackifier is meant to include plasticizers such as oils that meet the above tackifier definition. The weight of the rubbery phase in the copolymer is determined by the amount of elastomeric component that is added.

The amount of tackifier that is added can also be modified to change the modulus of the adhesive for applications where high shear strength is not needed and/or desired. The amounts of tackifier may be added to modify the plateau modulus, $G_{0,PSA}$ of the resulting pressure-sensitive adhesive according to the following equation:

$$G_{0,PSA} = v_c^2 G_{0,c}$$

wherein $v_c$ represents the volume fraction of the rubbery component in the soft matrix phase comprising the rubbery component and the tackifiers, and $G_{0,c}$ is the modulus of the neat copolymer (elastomer). The modulus of the copolymer can be determined from dynamic mechanical measurements. The present adhesive compositions typically have a calculated plateau modulus of less than $3 \times 10^6$ dyne/cm$^2$ (0.3 MPa) and, preferably, less than $10^6$ dyne/cm$^2$ (0.1 MPa).

Test Methods

Unless otherwise stated, the tapes were conditioned without a protective liner in a constant temperature and humidity (CTH) room (22° C.; 50% relative humidity) for about 24 hours before testing. All room temperature peel adhesion testing and room temperature static shear measurements were also conducted in the CTH room. Elevated temperature (70° C.) static shear testing was conducted in a preheated convection oven.

180° Peel Adhesion

A pressure-sensitive adhesive transfer tape was adhered to a 35 micrometer thick biaxially oriented polyethylene terephthalate film using a hand held 2 kg hard rubber roller to form a test tape. The side of the tape that faced the e-beam radiation was laminated to a polyethylene terephthalate film. The test tape was slit to a width of 1.27 cm and adhered to a test panel using two total passes of a 2 kg (4.5 lb) hard rubber roller. The test panels were cleaned by wiping twice with a tissue soaked with isopropanol and drying. Panels used were glass (GL), polypropylene (PP), high density polyethylene (PE), stainless steel (SS), and a metal panel painted with RK-7072 automotive paint obtained from DuPont Co. (Paint). Plastic panels were obtained from Aeromat Plastics, Burnsville, Minn. and stainless steel panels were obtained from Assurance Mfg., Minneapolis, Minn. After conditioning the bonded assembly for at least 24 hours in the CTH room, and the assembly is tested for 180° peel adhesion using an IMASS slip/peel tester (Model 3M90, commercially available from Instrumentors Inc., Strongsville, Ohio) at a rate of 30.5 cm/min (12 in/min) over a 10 second data collection time. Test results are reported in Newtons/decimeter (N/dm).

90° Peel Adhesion

A 1.27 cm by 11.4 cm strip of pressure-sensitive adhesive tape on a release liner was laminated to a 1.6 cm wide strip of 0.127 mm thick aluminum foil. The release liner was then removed and the tape is applied to a cleaned test panel (types of panels described above) using four total passes of a 2 kg (4.5 lb) hard rubber roller to form a test assembly. If the tape was a double coated tape or a foam tape, the side of the tape having the test adhesive was adhered to the test panel. Each test assembly was aged at one of the following conditions before testing:

1 hour at room temperature (22° C.) and 50% relative humidity (1H-RT)

24 hours room temperature (22° C.) and 50% relative humidity (24H-RT)

3 days at room temperature (22° C.) and 50% relative humidity (3D-RT)

3 days at 70° C. (3D-70° C.)

5 days at room temperature (22° C.) and 50% relative humidity (5D-RT)

5 days at 70° C. (5D-70° C.).

7 days at room temperature (22° C.) and 50% relative humidity (7D-RT)

7 days at 70° C. (7D-70° C.)

5 days at 100° C. and 100% humidity—5D-100/100

After aging, the panel was mounted in an Instron™ Tensile Tester such that the tape was pulled off at a 90° angle at a speed of 30.5 cm per minute unless otherwise indicated. Results were determined in pounds per 0.5 inch, and converted to Newtons per decimeter (N/dm).

Static Shear

A 1.27 cm wide pressure-sensitive adhesive tape on a release liner was laminated to a 1.6 cm wide strip of 0.127 mm thick aluminum foil. The release liner was removed and the tape was adhered to a clean rigid anodized aluminum panel with four passes of a 2 kg (4.5 lb) hard rubber roller such that a 1.27 cm by 2.54 cm portion of the tape was in firm contact with the panel and one end portion of the tape extended beyond the panel. The prepared panel was conditioned at room temperature, i.e., about 22° C. for at least 1 hour. The panel was then either hung in a constant temperature and humidity environment (22° C.; 50% relative humidity) for RT shear testing or in an air circulating oven maintained at 70° C. (70° C.). The sample was positioned 2 degrees from the vertical to prevent a peel mode failure. A 1000 gram weight was hung from the free end of the sample for the case of RT static shear testing and a 500 gram weight was hung for the 70° C. static shear testing. For 70° C. shear testing the panel was equilibrated in the oven for 10 min before the 500 g weight was hung from the free end of the tape. The time required for the weight to fall off was recorded in minutes. If no failure occurred within 10,000 minutes, the test was discontinued and results were recorded as 10000, indicating the that time is actually greater than 10,000 minutes. If the tape had fallen off in fewer than 10,000 minutes, the mode of failure was noted as cohesive failure within the adhesive, and indicated in the Table with a "C" or noted as adhesive failure when the adhesive pulled cleanly from the panel, and indicated in the Table with a "P".

Glossary of Materials

Regalite™ S101—Hydrogenated mixed aromatic tackifier resin with a Tg of 320° K, available from Hercules Inc., Wilmington, Del.

Regalite™ R125—Hydrogenated mixed aromatic tackifier resin with a Tg of 341° K, available from Hercules Inc., Wilmington, Del.

Escorez™ 2520 Aliphatic/Aromatic (mixed) hydrocarbon liquid tackifier with a Tg of 253° K, available from Exxon Chemical Company, Houston, Tex.

Escorez™ 1310 Hydrocarbon aliphatic tackifier with a Tg of 313.5° K, available from Exxon Chemical Company, Houston, Tex.

Shellflex™ 371—Napthenic Oil with a Tg of 209° K, available from Shell Chemical Company, Houston, Tex.

Wingtack Plus™—aromatically modified petroleum resin with a Tg of 315° K, available from Goodyear Tire & Rubber Company, Akron, Ohio Zonarez™ A-25—A poly alpha-pinene resin with a Tg of 251° K, available from Arizona Chemical Company, Panama City, Fla.

Irganox™ 1010—Pentaerythritol tetrakis (3-(3,5-di-tertiary-butyl-4-hydroxyphenyl)propionate Antioxidant/Stabilizer available from Ciba Specialty Chemicals Corporation, Tarrytown, N.Y.

Tinuvin™ 328—2-(2-hydroxy-3,5-di-teritary-amyl-phenyl)-2H-benzotriazole Ultra Violet (UV) light Stabilizer available from Ciba Specialty Chemicals Corporation, Tarrytown, N.Y.

Block Copolymer Preparation

A polymodal asymmetric elastomeric block copolymer was prepared according to the method described in U.S. Pat. No. 5,393,787, which is incorporated herein by reference in its entirety. The polymer had number average molecular weights of 4,000 and 21,500 for the two endblocks, 135,400 for the arm, and 1,087,000 for the star. The number average molecular weight was measured according using a Hewlett Packard Model 1082B size exclusion chromatograph equipped with two bimodal Zorbax PSM kits (two columns at 60-S Angstroms and two columns at 1000-S Angstroms) using the test method described in U.S. Pat. No. 5,296,547. The percent of high molecular weight arms was estimated to be about 30%, and the weight percent styrene was determined from the charge ratio of styrene and isoprene to be 9%. The copolymer was processed into pellets suitable for extrusion or other processing.

Hot Melt Composition A

A hot melt pressure-sensitive adhesive (PSA) composition was prepared by feeding a dry mixture of 100 parts of pellets of the above described copolymer, 2 parts of Irganox™ 1010 antioxidant, and 2 parts of Tinuvin™ 328 UV stabilizer to the first zone of a 30 mm Werner & Pfleiderer (ZSK-30) co-rotating twin screw extruder having three feed ports. The extruder screw had 12 sections with forward kneading in sections 2,4,6, and 8, and conveying in the remainder of the sections. The pellet mixture was fed to the extruder at a rate of about 2.06 kg/hr. Molten tackifier (Regalite™ S101) at a temperature of 163° C. was pumped into zone 5 at a feed rate of 2.31 kg/hr, and oil (Escorez™ 2520) was pumped into zone 7 at a feed rate of 0.24 kg/hr. Screw speed was approximately 275 RPM resulting in operating pressures of about 3.4 MPa (500 psi). The total output of the extruder was about 4.54 kg/hr. The temperature was 121° C. in zones 1 and 2, 163° C. in zones 3 and 4, 179° C. in zones 5 and 6, and 188° C. in zones 7–12. The exit hose, maintained at 188° C., conveyed the molten composition to a silicone release lined box where it cooled under ambient conditions.

Hot Melt Composition B

A hot melt pressure-sensitive adhesive (PSA) composition was prepared following the procedure for Hot Melt Composition A except the feed rates of the copolymer, Regalite™ S101 tackifier, and Escorez™ 2520 oil were 1.53 kg/hr, 2.35 kg/hr, and 0.66 kg/hr, respectively.

Hot Melt Composition C

A hot melt pressure sensitive adhesive (PSA) composition was prepared following the procedure for Hot Melt Composition A above except the feed rates of the copolymer, Regalite™ S101 tackifier, and Escorez™ 2520 oil were 1.53 kg/h, 2.71 kg/h, and 0.29 kg/h, respectively.

Hot Melt Composition D

A hot melt pressure-sensitive adhesive composition was prepared by mixing 97 parts isooctylacrylate, 3 parts acrylic acid, 0.15 part 2,2 dimethoxy-2-phenylacetophenone (Irgacure™ 651 available from Ciba Geigy) and 0.03 parts of IOTG (isooctyl thioglycolate). The composition was placed into film packages measuring approximately 10 cm by 5 cm by 0.5 cm thick packages as disclosed in U.S. Pat. No. 5,804,610 incorporated herein in its entirety by reference. The packaging film was a 0.0635 thick ethylene vinylacetate copolymer (VA-24 Film available from CT Film of Dallas, Tex.) The packaged composition was immersed in a water bath and at the same time exposed to ultraviolet radiation at an intensity of 3.5 milliWatts per square centimeter and a total energy of 1795 milliJoules per square centimeter as measured in NIST units to form a packaged pressure-sensitive-adhesive.

Hot Melt Composition E

A hot melt pressure-sensitive adhesive composition was prepared following the procedure for Hot Melt Composition D except that 90 parts of 2-ethylhexylacrylate and 10 parts of acrylic acid were used.

Hot Melt Composition F

A pressure-sensitive adhesive composition was prepared following the procedure for Hot Melt Composition D except that the composition was 93 parts of 2-ethylhexyl acrylate and 7 parts of acrylic acid and the total energy was 1627 milliJoules per square centimeter as measured in NIST units.

Hot Melt Composition G

A pressure-sensitive adhesive composition was prepared following the procedure for Hot Melt Composition D except that the composition was 90 parts of 2-ethylhexyl acrylate and 10 parts of acrylic acid.

Hot Melt Composition H

A pressure-sensitive adhesive composition was prepared following the procedure for Hot Melt Composition D except that the composition was 95 parts of 2-ethylhexyl acrylate and 5 parts of acrylic acid.

Hot Melt Composition I

A pressure-sensitive adhesive composition was prepared following the procedure for Hot Melt Composition A except the feed rates for the copolymer, Regalite™ S101 tackifier, and Escorez™ 2520 oil were 1.52 Kg/hr, 2.48 Kg/hr and 0.5 Kg/hr, respectively.

The invention will now be described further by way of the following examples.

EXAMPLES 1–10

Pressure-sensitive adhesive compositions were prepared by adding the amounts of the block copolymer, tackifier (Regalite™S101), oil (Escorez™2520), and antioxidant (Irganox 1010), all in parts by weight, shown in Table 1 to a glass jar. Sufficient toluene was added to each glass jar to form a 40% by weight solution. After the dry materials were dissolved in the toluene by sitting overnight on a shaker, the solutions were each knife coated onto a 50 micrometer (2 mil) silicone coated polyethylene terephthalate (PET) release liner to a thickness of about 312 micrometers. The coatings were dried in a preheated air circulating oven set at 70° C. for 15 minutes to remove the solvent, leaving a 127 micrometer thick adhesive forming an adhesive transfer tape. The adhesive tapes were then covered with a protective silicone coated paper release liner to await further processing.

The protective paper release liner was then removed and each example was irradiated with electron beam radiation with a dose of 4 Mrad and 175 kV using an Electrocurtain CB-300 electron beam system (available from Energy Sciences Inc., Wilmington, Mass.) to cross-link the adhesive. The tapes were tested for 180° Peel Adhesion and Static Shear according to the above test procedures. Test results, the Fox equation glass transition temperature ($T_g$), and the plateau modulus are shown in Table 1 for each example.

TABLE 1

| | Fox | | | Regalite ™ | Escorez ™ | Irganox ™ | 180° Peel Adhesion - N/dm | | | | | | Static Shear | |
| --- | --- | --- | --- | --- | --- | --- | --- | --- | --- | --- | --- | --- | --- | --- |
| | Tg | $G_0$ | Copolymer | S101 | 2520 | 1010 | 24H-RT | | | 5D-70° C. | | | Min | |
| Ex | ° K. | dyne/cm$^2$ | Parts | Parts | Parts | Parts | Glass | PP | PE | Glass | PP | PE | RT | 70° C. |
| 1 | 258 | 800000 | 100 | 94.5 | 4.9 | 2 | 152 | 115 | 68 | NT | NT | NT | 10000 | NT |
| 2 | 258 | 600000 | 100 | 97.2 | 31.6 | 2 | 177 | 120 | 79 | NT | NT | NT | 10000 | NT |
| 3 | 258 | 350000 | 100 | 103.5 | 93.3 | 2 | 206 | 126 | 84 | NT | NT | NT | 1269 P | NT |
| 4 | 263 | 600000 | 100 | 116.7 | 12.1 | 2 | 184 | 124 | 68 | 150 | 119 | 67 | 10000 | 10000 |
| 5 | 263 | 350000 | 100 | 129.1 | 67.7 | 2 | 254 | 158 | 113 | NT | NT | NT | 5694 P | NT |
| 6 | 263 | 100000 | 100 | 174.6 | 272.8 | 2 | 209 | 188 | 133 | NT | NT | NT | 1049 C | NT |
| 7 | 268 | 350000 | 100 | 153.7 | 43.0 | 2 | 191 | 180 | 121 | 222 | 152 | 111 | 10000 | 10000 |
| 8 | 268 | 100000 | 100 | 220.7 | 226.6 | 2 | 213 | 203 | 133 | NT | NT | NT | 1055 C | NT |
| 9 | 273 | 350000 | 100 | 177.5 | 19.3 | 2 | 224 | 194 | 64 | 254 | 201 | 152 | 10000 | 10000 |
| 10 | 273 | 100000 | 100 | 265.2 | 182.2 | 2 | 286 | 273 | 156 | NT | NT | NT | 1579 C | NT |

NT—Not tested

The data in Table 1 show that the adhesives of the invention have excellent adhesion to low energy surfaces (polyethylene and polypropylene) as well as high energy surfaces (glass), and can be formulated to have excellent shear strength at elevated temperatures. Additionally, the data in Examples 6,7, and 9 show that elevated temperature aging of the samples prior to testing had no deleterious effect on the adhesion properties.

EXAMPLES 11–16

Pressure-sensitive adhesive transfer tapes were prepared following the procedure for Example 1 except that varying amounts of the different tackifiers and oils shown in Table 2 were used. The adhesive tapes were irradiated at a dose of 4 Mrad at 225 kV. 180° Peel Adhesion (24H-RT) and Static Shear testing results are shown in Table 2.

TABLE 2

| | Fox | $G_0$ | Regalite™ S101 | Shellflex™ 371 | 180° Peel Adhesion N/dm | | | Static Shear Min | |
|---|---|---|---|---|---|---|---|---|---|
| Ex | Tg °K. | Dynes/cm$^2$ | Parts | Parts | Glass | PP | PE | RT | 70° C. |
| 11 | 263 | 600000 | 122.8 | 6.0 | 141 | 107 | 74 | 10000 | 10000 |
| 12 | 263 | 500000 | 135.2 | 14.6 | 152 | 131 | 79 | 10000 | 7466 P |
| 13 | 265.5 | 600000 | 127.5 | 1.3 | 168 | 132 | 88 | 10000 | 9539 P |
| 14 | 265.5 | 500000 | 140.4 | 9.4 | 172 | 128 | 95 | 10000 | 8287 P |
| 15 | 265.5 | 350000 | 169.2 | 27.5 | 178 | 139 | 98 | 10000 | 2042 P |
| 16 | 268 | 500000 | 145.5 | 4.3 | 193 | 147 | 102 | 10000 | 10000 |

EXAMPLES 17–24

Pressure-sensitive adhesive tapes were prepared following the procedure for Example 1 except that a different tackifying resin was used in the amounts indicated in Table 3 and 2 parts of a UV stabilizer (Tinuvin 328) were added in addition to the antioxidant. The tapes were irradiated with a dose of 8 Mrad at 175 kV and tested for 180° peel adhesion (24H-RT) and static shear. Results are also shown in the Table 3.

resulting in operating pressures of about 3.4–5.5 MPa (500–800 psi) and a total flow rate in the range of about 2.72 to 3.62 kg/h. The temperature was 149° C. in zones 1 and 2, 157° C. in zones 3 and 4, 160° C. in zones 5 and 6, and 163° C. in zones 7–12. The exit hose, maintained at 165.5° C., conveyed the molten pressure-sensitive adhesive composition to a 0.5 mm (20 mil) shimmed, 15.24 cm wide drop die maintained at 165.5° C. where the extrudate was collected as a 125 micrometer thick pressure-sensitive adhesive transfer tape between two silicone coated paper release liners.

TABLE 3

| | Fox | $G_0$ | Regalite™ R125 | Excorex™ 2520 | 180° Peel Adhesion N/dm | | | Static Shear Min | |
|---|---|---|---|---|---|---|---|---|---|
| Ex | Tg °K. | Dynes/cm$^2$ | Parts | Parts | Glass | PP | PE | RT | 70° C. |
| 17 | 263 | 800000 | 90.4 | 9.0 | 150 | 142 | 67 | 10000 | 10000 |
| 18 | 265 | 800000 | 95.7 | 3.6 | 184 | 142 | 78 | 10000 | 10000 |
| 19 | 265 | 600000 | 100.9 | 27.9 | 189 | 147 | 85 | 3254 P | 10000 |
| 20 | 268 | 600000 | 110.0 | 18.8 | 218 | 120 | 101 | 6124 P | 10000 |
| 21 | 268 | 350000 | 124.7 | 72.0 | 205 | 129 | 115 | 1126 P | 219P |
| 22 | 270 | 600000 | 116.0 | 12.8 | 224 | 131 | 112 | 6456 P | 10000 |
| 23 | 271 | 680000 | 115.5 | 0 | 244 | 224 | 112 | 10000 | 10000 |
| 24 | 268 | 760000 | 104.8 | 0 | 233 | 191 | 98 | 10000 | 10000 |

EXAMPLES 25–31

For Examples 25–28, a composition was prepared by mixing 100 parts of copolymer pellets, 2 parts of Irganox™ 1010 antioxidant, and 2 of parts Tinuvin™ 328 UV stabilizer (Feed I). The mixture was fed to zone 1 of a 30 mm Werner & Pfleiderer co-rotating twin screw extruder (Model ZSK-30) having 12 section screws with forward kneading in sections 2, 4, 6, and 8, and conveying sections in the remaining sections. A molten tackifier (Regalite™S101), heated to about 177° C., was fed into zone 5 using a Helicon pump (Feed II), and an oil (Escorez™ 2520) was fed into zone 7 (Feed III). The feed rates for each example are shown in Table 4. The screw speed was approximately 300 RPM One of the liners was then removed and each example was irradiated with electron beam radiation using an Electrocurtain CB-300 electron beam system (available from Energy Sciences Inc., Wilmington, Mass.). Examples 25–28 were irradiated with 225 kV and a dose of 6 Mrads.

Adhesive tapes for Examples 29–31 were prepared following the procedure for Example 25 except that the tackifier used was Escorez™1310LC and the oil used was Shellflex™371. Feed rates are shown in Table 4. The Examples were irradiated with a dose of 4 Mrad at 225 kV to cross link the adhesive. Test results for 180° peel adhesion (24H-RT) and static shear of the adhesives are shown in Table 4.

TABLE 4

| | Feed I | Feed II | Feed III | 180° Peel Adhesion - N/dm | | | Static Shear - min | |
|---|---|---|---|---|---|---|---|---|
| Ex | Kg/h | Kg/h | Kg/h | Glass | PP | PE | RT | 70° C. |
| 25 | 1.215 | 1.365 | 0.141 | 168 | 138 | 81 | 10000 | 10000 |
| 26 | 0.943 | 1.279 | 0.499 | 305 | 193 | 141 | 10000 | 185 P |
| 27 | 0.943 | 1.393 | 0.39 | 295 | 205 | 145 | 10000 | 107 P |
| 28 | 1.116 | 1.601 | 0.005 | 213 | 161 | 103 | 10000 | 10000 |
| 29 | 1.606 | 2.009 | 0 | 161 | 152 | 88 | 10000 | 10000 |
| 30 | 1.238 | 2.059 | 0.331 | 149 | 146 | 88 | 10000 | 38 C |
| 31 | 0.930 | 1.606 | 0.191 | 180 | 176 | 95 | 10000 | 46 C |

That data in Table 4 illustrate the utility of hot melt coated compositions of the invention on low energy surfaces.

COMPARATIVE EXAMPLES C1–C5

A pressure-sensitive adhesive having 100 parts of copolymer, 40 parts of a tackifier (Wingtack™ Plus) and 30 parts of a plasticizer (Zonarex™ A-25) was prepared following the procedure for Example 1. The Fox Glass Transition Temperature ($T_g$) of the adhesive was 240.5° K. Portions of the adhesive were irradiated with electron beam radiation as voltages and doses shown in Table 5. The adhesives were then tested for 180° peel adhesion and static shear; results are shown in Table 5.

TABLE 5

| Example | E-beam Irradiation KV | Mrad | 180° Peel Adhesion - N/dm Glass | PP | PE | Static Shear-min RT | 70° C. |
|---|---|---|---|---|---|---|---|
| C1 | None | None | 78 | 66 | 14 | 10000 | 1615 C |
| C2 | 150 | 5 | 68 | 57 | 11 | 10000 | 10000 |
| C3 | 175 | 4 | 63 | 58 | 14 | 10000 | 10000 |
| C4 | 175 | 5 | 59 | 56 | 17 | 10000 | 10000 |
| C5 | 225 | 4 | 59 | 57 | 14 | 10000 | 10000 |

The data in Table 5 and from the previous examples illustrate the superior adhesion that adhesives of the invention have on low energy surfaces.

EXAMPLES 32–37

Pressure-sensitive adhesive foam tapes were prepared by laminating each of the cross-linked adhesive transfer tapes of Examples 11–16 to a one mm thick acrylic foam that is the core of a pressure-sensitive adhesive tape construction (VHB 4941 available from 3M Company, St. Paul, Minn.) using four passes of a 2 kg (4.5 lb) hard rubber roller such that the side which faced the electron beam radiation was against one of the major surfaces of the foam. The tapes were tested for static shear and 90° peel adhesion according to the above test procedures on the substrates indicated. Test results are shown in Table 6.

TABLE 6

| Ex | Transfer Tape | 90° peel adhesion - N/dm 5D-RT Steel | PP | PE | 5D-70° C. Steel | PP | PE | Static shear Min 70° C. |
|---|---|---|---|---|---|---|---|---|
| 32 | Ex 11 | 401 | 427 | 168 | 284 | 385 | 203 | 10000 |
| 33 | Ex 12 | 364 | 508 | 182 | 291 | 409 | 214 | 10000 |
| 34 | Ex 13 | 382 | 482 | 196 | 315 | 412 | 205 | 10000 |
| 35 | Ex 14 | 485 | 550 | 214 | 356 | 457 | 242 | 10000 |
| 36 | Ex 15 | 394 | 511 | 198 | 408 | 489 | 252 | 10000 |
| 37 | Ex 16 | 541 | 485 | 198 | 389 | 529 | 264 | 10000 |

The data in Table 5 illustrate acrylic foam tapes of the invention.

The foam tape of Example 35 was also tested on other commercially available plastic substrates for 90° peel adhesion. The substrates were cleaned as described above and were obtained from Aeromat Plastics, Burnesville, Minn. Test assemblies were conditioned at 3D-RT and 3D-70° C. Test results are shown in Table 7.

TABLE 7

| Plastic | 90° peel adhesion 3D-RT | 3D-70° C. |
|---|---|---|
| ABS[1] | 408 | 595 |
| LDPE[2] | 280 | 177 |
| PVC[3] | 411 | 485 |
| Polystyrene | 471 | 490 |
| Polycarbonate[4] | 508 | 548 |
| PMMA[5] | 501 | 620 |
| Nylon | 382 | 481 |

[1]Acrylonitrile - butadiene-styrene
[2]Low density polyethylene
[3]Polyvinyl chloride
[4]Lexan ™ polycarbonate, GE Plastics
[5]Plexiglas ™ polymethyl methacrylate, Atofina Chemicals The data in Table 7 illustrate the utility of the invention on various plastic substrates.

EXAMPLES 38–39

An expandable pressure-sensitive adhesive composition was prepared by feeding a dry blended mixture having 67 parts of copolymer, 33 parts Regalite™ S101 tackifier, 1.34 parts Irganox™ 1010, and 1.34 parts Tinuvin™ 328 into zone 1 of 25 mm Berstorff twin screw extruder (Model ZE-25, L/D=36:1, Florence, Ky.) using a K-tron gravimetric feeder (Model F-1, S/N:930601, Pitman, N.J.) such that the feed rate was 2.29 kg/h. A grid melter (ITW Dynatech Model O22S, Burlington, Mass.) was used to feed 1.57 kg/h of molten Regalite™ S101 at a temperature of 182° C. into zone 3. A Zenith gear pump (1.2 cm³/rev. Zenith gear pump obtained from Parker Hannifin Corp., Sanford, N.C.) was used to feed 0.66 kg/h of heated Escorez™ 2520 oil (25° C.) into zone 7. Encapsulated microspheres having a shell composition containing acrylonitrile and methacrylonitrile (F100D available from Pierce-Stevens Inc., Buffalo, N.Y.) were added to zone 8 using a K-tron gravimetric feeder (Model KCLKT20, Pitman, N.J.) at a feed rate of 0.077 kg/h. The screw, having multiple kneading and conveying sections, was run at 275 RPM. The extruder zones were set with a decreasing temperature profile as follows: zone 2 & 3 at 160° C., zones 5–7 at 120° C., and zones 8–10 at 110° C. The expandable adhesive composition was then fed into a 5 cm³/rev Zenith gear pump at the exit of the 25 mm extruder and transported to a Cloeren three layer feedblock (Model 96–1501, Orange, Tex.) using a 1.27 cm OD stainless steel transfer piping that was operated at 149° C., and then through a 25.4 cm wide die (Ultraflex 40 obtained from EDI Chippewa Falls, Wis.) operated at 177° C. with a die gap of 1.52 mm (60 mils). The extruded material leaving the die was in the form of a foamed adhesive sheet. The sheet was cast onto a chill roll that was set at 10° C., cooled to about 25° C., and then transferred onto a 0.127 mm thick polyethylene release liner. The thickness of the foamed sheet, which was controlled by the collecting web speed, for Example 38 was 0.5 mm. After cooling, the foam sheet was covered with another 0.127 mm thick polyethylene release liner and crosslinked using an electron beam processing unit (Electrocurtain CB 300) operating at an accelerating voltage of 300 kV and a measured dose of 6 megaRads (Mrads). The sheet was exposed to the electron beam from each of the two major surfaces. The resulting foamed adhesive sheet was tacky. Example 39 was prepared following the procedure for Example 38 except the thickness was 1 mm (40 mil).

The foamed adhesive sheets were tested for 90° peel adhesion and static shear strength. Test results are shown in Table 8.

EXAMPLES 40–49

A pressure-sensitive adhesive foam sheet was prepared following the procedure for Example 39, except that the 3 layer feedblock was also fed with molten Hot Melt Composition B such that Composition B was co-extruded as skin layers on each major surface of the foam sheet. Composition B was melted in a 5.08 cm Bonnot single screw extruder (Model 2" WPKR, Green, Ohio) with a 5 cm$^3$/rev Zenith gear pump and transported to the feedblock using a 1.27 cm OD heated stainless steel transfer piping. The single screw extruder, gear pump, and piping were operated at 177° C. The skin layers and the layer containing the microspheres were combined in the feedblock and then passed through the single layer die where it exited as a foamed sheet having adhesive skin layers. The sheet was collected in the manner described above.

Examples 40–46 were coextruded polymodal asymmetric elastomeric block copolymer adhesive foam tapes made with polymodal asymmetric elastomeric block copolymer adhesive skins. The thickness of each of the skin layers of Hot Melt Composition B was 75 micrometers (3 mil) for Example 40 and 125 micrometers (5 mil) for Examples 41. Example 42 was prepared according to the procedure for Example 41 except that the microsphere feed rate was 0.154 kg/h in zone 8 of the extruder. Example 43 was prepared according to the procedure for Example 41 except that the microsphere feed rate was 0.231 kg/h in zone 8 of the extruder. Example 44 was prepared according to the procedure for Example 41 except that the co-extruded skins were made from Hot Melt Composition A. Example 45 was prepared according to the procedure for Example 41 except that the co-extruded skins were made from Hot Melt Composition C. Example 46 was prepared following the procedure for Example 41 except that the co-extruded skins were Hot Melt Composition C and the feed rates of components varied as follows. The dry blended mixture of 64 parts of copolymer, 36 parts Regalite™ S101 tackifier, 1.28 parts Irganox™ 010, and 1.28 parts Tinuvin™ 328, was fed into zone 1 at feed rate of 2.422 kg/h; the grid melter fed 1.819 kg/h of molten Regalite™ S101 into zone 3, and the Zenith gear pump fed 0.295 kg/h of Escorez™ 2520 oil into zone 7 of the extruder. The expandable microspheres were added to zone 8 at 0.077 kg/h.

Example 47 was prepared following the procedure for Example 44 except the three feeds to zones 1, 3, and 7 were replaced by a single feed of Hot Melt Composition D into zone 1 of the twin screw extruder from a 5.08 cm Bonnot single screw extruder (Model 2"WPKR, Green, Ohio) operated at a flow rate of 4.54 kg/h and temperatures of 175° C. The packages of adhesive (Hot Melt Composition D), including the packaging material, had been softened and mixed in the single screw extruder. The F100D expandable microspheres were added at a feed rate of 0.091 kg/h to zone 8 of the extruder and the co-extruded skins were Hot Melt Composition C. After extrusion, the foams were electron beam crosslinked using with a dose of 6 MRad at an accelerating voltage of 300 kV from both sides of the foam. Example 48 was prepared following the procedure for Example 47 except the feed in zone 1 was replaced with Hot Melt Composition E.

Example 49 was prepared by laminating a 50 micrometer thick acrylic pressure-sensitive adhesive transfer tape (9471 LE available from 3M Company, St Paul, Minn.) to each side of the foam of Example 2 using four passes of a 2 kg (4.5 lb) hard rubber roller. These exemplary adhesives and tapes were tested for 90° peel adhesion and static shear strength. Test results are shown in Table 8.

TABLE 8

| Ex | 90° Peel Adhesion N/dm 3D-RT | | | 90° Peel Adhesion N/dm 3D-70° | | | Static Shear - min | |
|---|---|---|---|---|---|---|---|---|
| | SS | PP | PE | SS | PP | PE | RT | 70 |
| 38 | 56 | 86 | 44 | 49 | 58 | 40 | 10000 | 10000 |
| 39 | 156 | 268 | 89 | 159 | 172 | 93 | 10000 | 10000 |
| 40 | 292 | 408 | 208 | 312 | 475 | 212 | 10000 | 10000 |
| 41 | 343 | 454 | 215 | 326 | 503 | 235 | 10000 | 10000 |
| 42 | 334 | 452 | 187 | 322 | 503 | 200 | 10000 | 10000 |
| 43 | 208 | 231 | 91 | 270 | 158 | 110 | 10000 | 10000 |
| 44 | 293 | 466 | 135 | 308 | 434 | 147 | 10000 | 2846 P |
| 45 | 473 | 567 | 138 | 403 | 503 | 219 | 10000 | 5848 P |
| 46 | 545 | 615 | 159 | 536 | 623 | 254 | 10000 | 1934 P |
| 47 | 487 | 457 | 172 | 508 | 499 | 212 | 173 C | 194 C |
| 48 | 384 | 426 | 177 | 308 | 406 | 217 | 3201 C | 855 C |
| 49 | 131 | 163 | 42 | NT | NT | NT | 88* | 3* |

*Failed at the adhesive skin/foam interface (i.e., delaminated)

EXAMPLES 50–53

Hot Melt Composition F was compounded in a 51 mm single screw extruder (Bonnot) for Example 50. The temperatures in the extruder and the flexible hose at the exit end of the extruder were all set at 93.3° C. and the flow rate was controlled with a Zenith gear pump. The compounded adhesive was then fed to a 30 mm co-rotating twin screw extruder with three additive ports (Werner Pfleider) operating at a screw speed of 200 rpm with a flow rate of about 15 pounds/hour (6.8 kilograms/hour). The temperature for all of the zones in the twin screw extruder was set 93.3° C. Expandable polymeric microspheres having a shell composition containing acrylonitrile and methacrylonitrile (F80 SD available from Pierce Stevens, Buffalo, N.Y.) were added downstream to the third feed port about three-fourths of the way down the extruder barrel at a feed rate of 1.4 parts by weight per one hundred parts of hot melt composition. The hose and die temperatures were set at 193.3° C. The foamed extrudate containing the microspheres was pumped to a 3-layer co-extrusion feedblock as the center layer of a 3-layer construction. The feedblock temperature was set at 160° C. Hot Melt Composition C was fed to a second 51 mm single screw extruder (Bonnot) and compounded. The temperatures in the extruder and the flexible hose at the exit end of the extruder were all set at 150° C. and the flow rate from was controlled with a Zenith gear pump. The compounded composition was then fed to the feedblock, which split the incoming stream to provide a layer of Hot Melt Composition to each face of the foamed sheet which was then fed through a 20.32 cm wide drop die shimmed to a thickness of 1.016 mm. The die temperature was set at 182° C. The gear pump was set to provide 76 micrometer thick layers of adhesive to each face of the foamed sheet. The resulting foam acrylic sheet having adhesive outerlayers had a thickness of about 1145 micrometers. The extruded sheet was cast onto a chill roll that was set at 7.2° C., cooled to about 25° C., and then transferred onto a 0.127 mm thick polyethylene release liner. The sheets were then cross-linked by exposing to electron beam radiation at a measured dose of 6 Mrads and an accelerating voltage of 300 kV from both sides.

Example 51 was prepared following the procedure for Example 50 except that Hot Melt Composition H was used as the foam layer and Hot Melt Composition K as the adhesive skin layers. Example 52 was prepared following the procedure for Example 50 except that Hot Melt Composition H was used as the foam layer and Hot Melt Composition I as the adhesive skin layers. Example 53 was prepared following the procedure for Example 50 except that Hot Melt Composition H was used as the foam layer and Hot Melt Composition A as the adhesive skin layers.

All of these foam tapes were tacky and were tested for peel adhesion and static shear. Test results are shown in Table 9.

EXAMPLES 54–59

A commercially available polyethylene foam (0.16 cm thick 6E Foam available from Voltek) was primed with Scotch-mount 4298 Adhesion Promotor (available from 3M Company) by applying a thin layer of primer to each side of the foam with a sponge applicator and allowing the solvent to evaporate (approximately 1 minute). Then the transfer tapes were laminated to each side of the polyethylene foam using hand pressure. Examples 57–59 were prepared in the same manner except that the foam was 545 Polyurethane Foam (available from Norton).

The transfer tapes used were: Examples 54 and 57—tape from Example 7 except the e-beam conditions were 175 kV at 8 Mrad; Examples 55 and 58—tape from Example 14; Examples 56 and 59—tape from Example 28.

Testing results for the laminated tapes are shown in Table 9.

Foam Articles

The invention can feature articles that include a polymer foam featuring a polymer matrix and one or more expandable polymer microspheres like that disclosed in PCT Patent Application No. PCT/US99/17344. Examination of the foam by electron microscopy reveals that the foam microstructure is characterized by a plurality of enlarged polymeric microspheres (relative to their original size) distributed throughout the polymer matrix. At least one of the microspheres (and preferably more) is still expandable, i.e., upon application of heat it will expand further without breaking. This can be demonstrated by exposing the foam to a heat treatment and comparing the size of the microspheres obtain by electron microscopy to their pre-heat treated size (also obtained by electron microscopy).

Figure 2A:
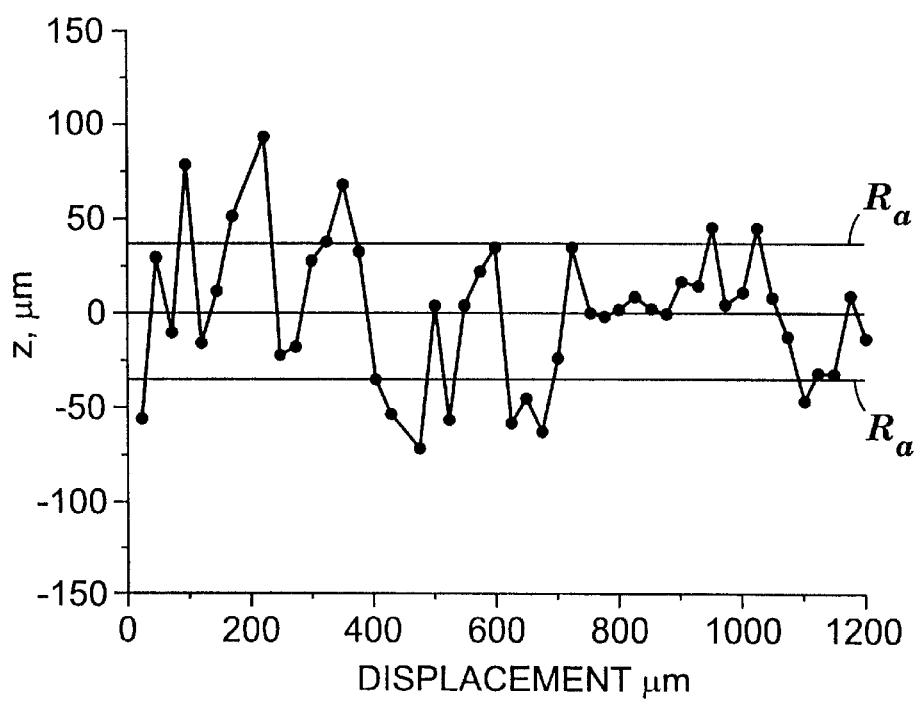
FIG. 2(*a*) is a plot showing the Ra value obtained by laser triangulation profilometry for the sample described in Example 58.
Figure 1B:
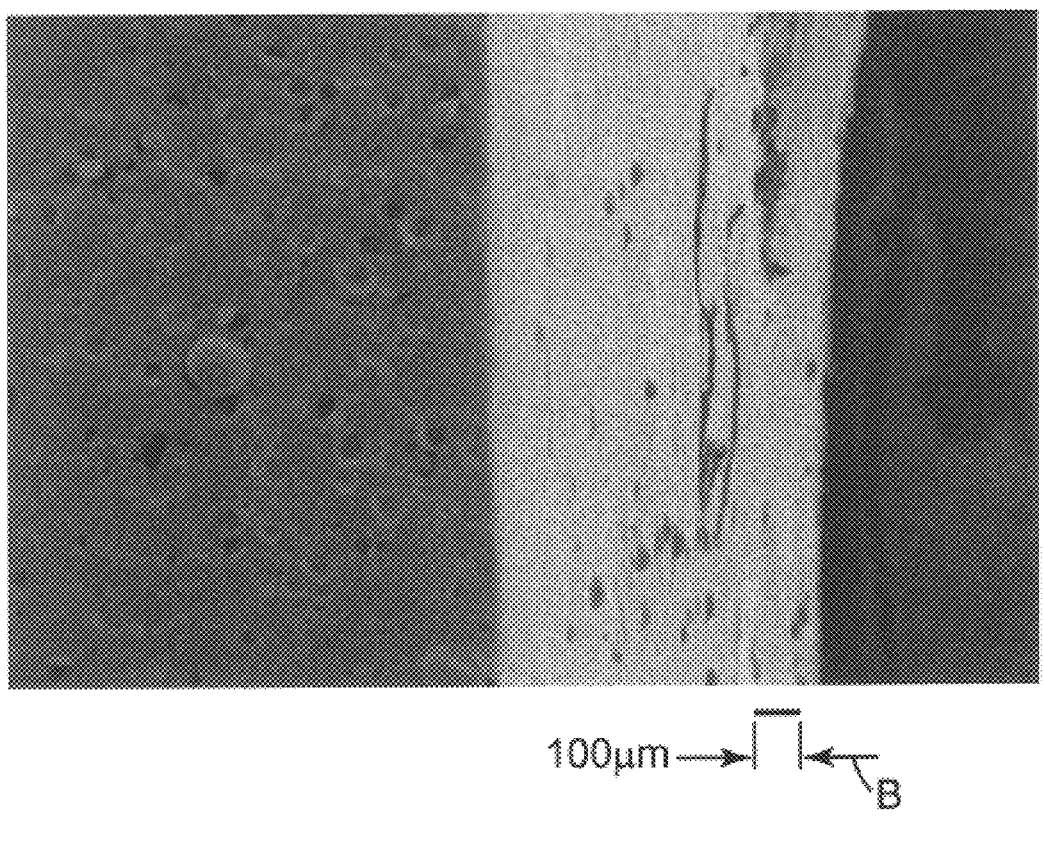
Figure 2B:
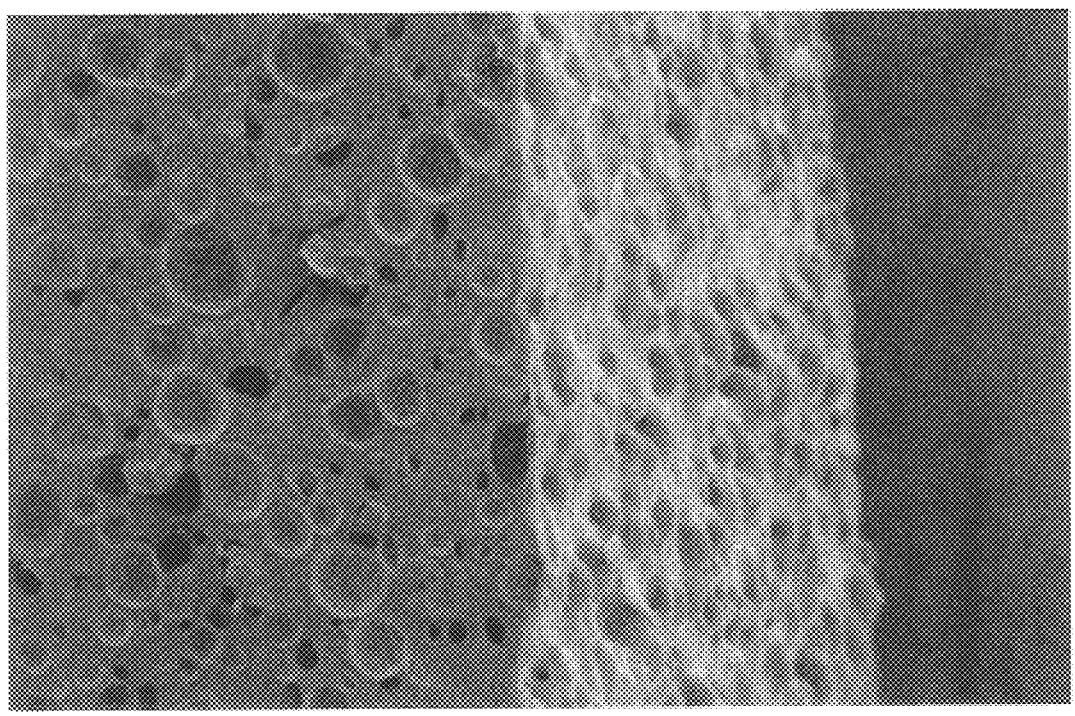

The foam is further characterized by a surface that is substantially smooth, as defined in the Summary of the Invention, above. Laser triangulation profilometry results and scanning electron photomicrographs are shown in FIGS. 1 and 2 for representative acrylic foams having substantially smooth surfaces prepared as described in Examples 12 and 58, respectively, described in further detail below. Each of the photomicrographs of FIGS. 1(b) and 2(b) includes a 100 micrometer long measurement bar B. Each of the samples in FIGS. 1(b) and 2(b) have been sectioned, with the surface portion being light and the sectioned portion being dark.

Figure 3:
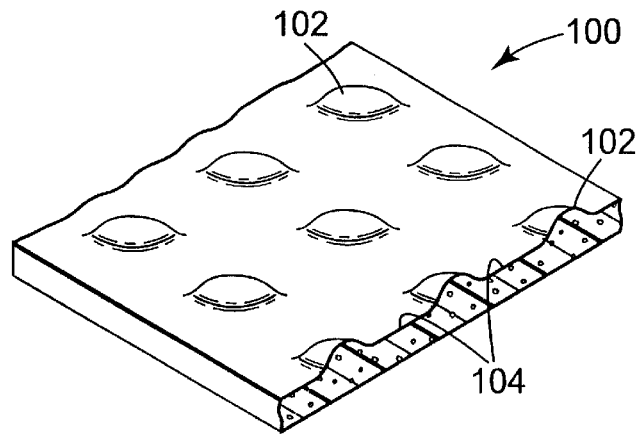
FIG. 3 is a perspective drawing showing a foam having a patterned surface.

The foam may be provided in a variety of forms, including a sheet, rod, or cylinder. In addition, the surface of the foam may be patterned. An example of such a foam is shown in FIG. 3. Foam 100 is in the form of a sheet having a uniform pattern of bumps 102 arranged on the surface of the foam. Such articles are prepared by differential foaming, as described in more detail, below. The differential foaming process creates bumps 102 having a density different from the density of the surrounding areas 104.

A variety of different polymer resins, as well as blends thereof, may be used for the polymer matrix as long as the resins are suitable for melt extrusion processing. For example, it may be desirable to blend two or more acrylate polymers having different compositions. A wide range of foam physical properties can be obtained by manipulation of the blend component type and concentration. The particular resin is selected based upon the desired properties of the final foam-containing article. The morphology of the immiscible polymer blend that comprises the foam matrix can enhance the performance of the resulting foam article. The

TABLE 9

| | 90° Peel Adhesion - N/dm | | | | | | | T-peel | Static Shear* |
|---|---|---|---|---|---|---|---|---|---|
| | 1H-RT | | 3D-RT | | 7D-70° C. | | 5D-100/100 | N/dm | 70° C. |
| Ex | Paint | PP | Paint | PP | Paint | PP | Paint | Paint | Min |
| 50 | 238 | NT | 525 | NT | 536 | NT | 501 | 287 | 10,000 |
| 51 | 109 | NT | 235 | NT | 501 | NT | 364 | 273 | 10,000 |
| 52 | 77 | NT | 508 | NT | 462 | NT | 476 | 270 | 10,000 |
| 53 | 102 | NT | 469 | NT | 466 | NT | 312 | 210 | 10,000 |
| 54 | 424 | NT | 347 | 424 | 378 | 399 | NT | NT | NT |
| 55 | 116 | 876 | 175 | 133 | 399 | 392 | NT | NT | NT |
| 56 | 284 | 193 | 403 | 413 | 406 | 378 | NT | NT | NT |
| 57 | 249 | 154 | 298 | 308 | 371 | 550 | NT | NT | NT |
| 58 | 245 | 182 | 312 | 308 | 501 | 438 | NT | NT | NT |
| 59 | 182 | 126 | 228 | 308 | 361 | 336 | NT | NT | NT |

*Tested with a 750 g weight and the overlap was 2.54 cm by 2.54 cm blend morphology can be, for example, spherical, ellipsoidal, fibrillar, co-continuous or combinations thereof. These morphologies can lead to a unique set of properties that are not obtainable by a single component foam system. Such unique properties may include, for example, an isotropic mechanical properties, or enhanced cohesive strength. The morphology (shape & size) of the immiscible polymer blend can be controlled by the free energy considerations of the polymer system, relative viscosities of the components, and most notably the processing & coating characteristics. By proper control of these variables, the morphology of the foam can be manipulated to provide superior properties for the intended article.

Figure 13A:
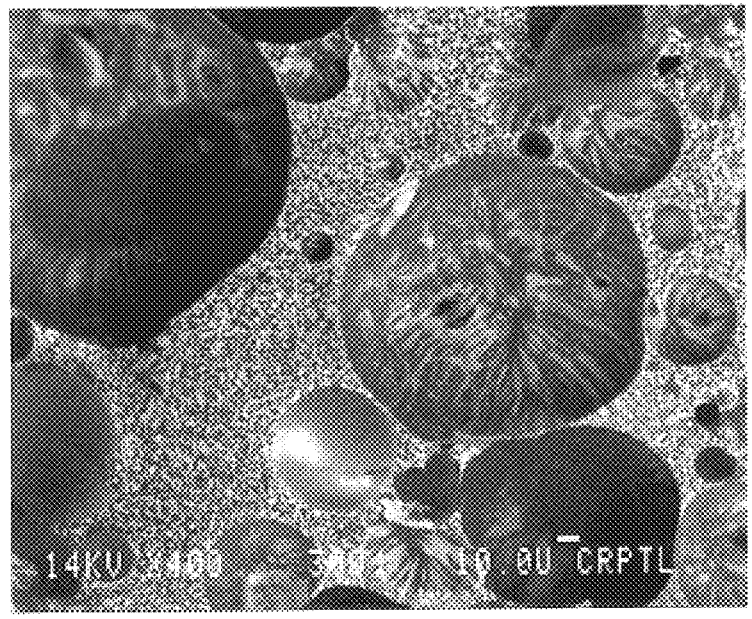
FIGS. 13a and 13b are SEM photomicrographs of cross-sections, as viewed in the machine direction (MD) and crossweb direction (CD), respectively, of the polymer blend foam described in Example 23.
Figure 13B:
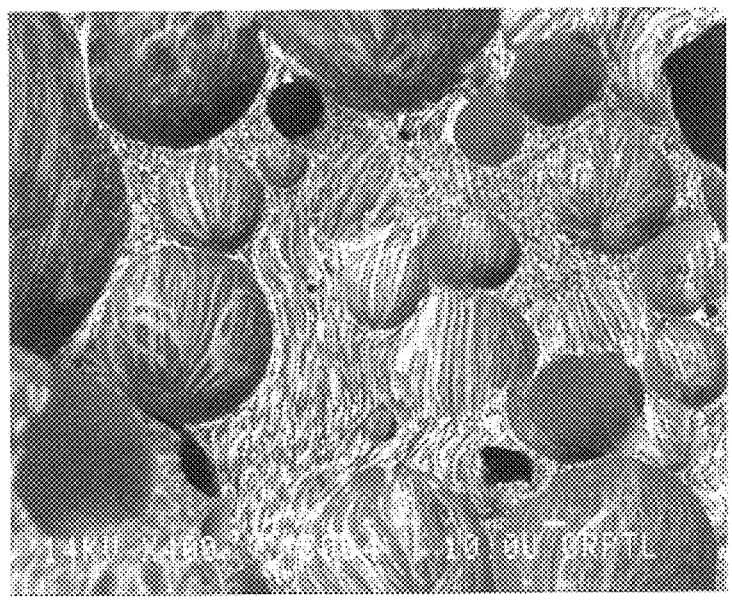

FIGS. 13a and 13b show SEM photomicrographs of the microstructure of the immiscible polymer blend of Example 23 (i.e., 80 wt % of the Hot Melt Composition 1 and 20 wt % of Kraton™ D1107). The Kraton™ D1107 was stained with $OsO_4$ so as to appear white, which enables this phase to be viewed. These Figures demonstrate that the Kraton™ D1107 phase is a complex morphology consisting of fibrillar and spherical microstructures, with sizes of approximately 1 μm. In FIG. 13a, the Kraton™ D1107 fibrillar phases are shown in cross-section and appear spherical.

One class of useful polymers includes acrylate and methacrylate adhesive polymers and copolymers. Such polymers can be formed by polymerizing one or more monomeric acrylic or methacrylic esters of non-tertiary alkyl alcohols, with the alkyl groups having form 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates, e.g., benzyl acrylate and cyclobenzyl acrylate.

Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates", vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate ($T_g$=−71° C.) and a methoxypolyethylene glycol 400 acrylate ($T_g$=−65° C.; available from Shin Nakamura Chemical Co., Ltd. under the designation "NK Ester AM-90G").

A second class of polymers useful for the polymer matrix of the foam includes acrylate-insoluble polymers. Examples include semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, polyamides and co-polyamides, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate. Other examples of acrylate-insoluble polymers include amorphous polymers having a solubility parameter (as measured according to the Fedors technique) less than 8 or greater than 11 such as polyacrylonitrile, polyvinyl chloride, thermoplastic polyurethanes, aromatic epoxies, polycarbonate, amorphous polyesters, amorphous polyamides, ABS copolymers, polyphenylene oxide alloys, ionomers (e.g., ethylene-methacrylic acid copolymers neutralized with salt), fluorinated elastomers, and polydimethyl siloxane.

A third class of polymers useful for the polymer matrix of the foam includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber. The third class is not the most efficient way to do this.

A fourth class of polymers useful for the polymer matrix of the foam includes pressure sensitive and hot melt adhesives prepared from non-photopolymerizable monomers. Such polymers can be adhesive polymers (i.e., polymers that are inherently adhesive), or polymers that are not inherently adhesive but are capable of forming adhesive compositions when compounded with tackifiers. Specific examples include poly-alpha-olefins (e.g., polyoctene, polyhexene, and atactic polypropylene), block copolymer-based adhesives (e.g., di-block, tri-block, star-block and combinations thereof), polymodal asymmetric elastomeric block copolymers, natural and synthetic rubbers, silicone adhesives, ethylene-vinyl acetate, and epoxy-containing structural adhesive blends (e.g., epoxy-acrylate and epoxy-polyester blends).

The expandable microspheres feature a flexible, thermoplastic, polymeric shell and a core that includes a liquid and/or gas which expands upon heating. Preferably, the core material is an organic substance that has a lower boiling point than the softening temperature of the polymeric shell. Examples of suitable core materials include propane, butane, pentane, isobutane, neopentane, and combinations thereof.

The choice of thermoplastic resin for the polymeric shell influences the mechanical properties of the foam. Accordingly, the properties of the foam may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, actylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres having essentially no vinylidene chloride units.

Examples of suitable commercially available expandable polymeric microspheres include those available from Pierce Stevens (Buffalo, N.Y.) under the designations "F30D," "F80SD," and "F100D." Also suitable are expandable polymeric microspheres available from Akzo-Nobel under the designations "Expancel 551," "Expancel 461," and "Expancel 091." Each of these microspheres features an acrylonitrile-containing shell. In addition, the F80SD, F100D, and Expancel 091 microspheres have essentially no vinylidene chloride units in the shell.

The amount of expandable microspheres is selected based upon the desired properties of the foam product. In general, the higher the microsphere concentration, the lower the density of the foam. In general, the amount of microspheres ranges from about 0.1 parts by weight to about 50 parts by weight (based upon 100 parts of polymer resin), more preferably from about 0.5 parts by weight to about 20 parts by weight.

The foam may also include a number of other additives. Examples of suitable additives include tackifiers (e.g., rosin esters, terpenes, phenols, and aliphatic, aromatic, or mixtures of aliphatic and aromatic synthetic hydrocarbon resins), plasticizers, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. Chemical blowing agents may be added as well. The agents are added in amounts sufficient to obtain the desired end properties.

The properties of the article may be adjusted by combining one or more polymer compositions with the foam. These additional compositions may take several forms, including layers, stripes, etc. Both foamed and non-foamed compositions may be used. A composition may be bonded directly to the foam or indirectly, e.g., through a separate adhesive. In some embodiments, the additional polymer composition is removably bonded to the foam; such compositions can subsequently be stripped from the foam.

Figure 4:
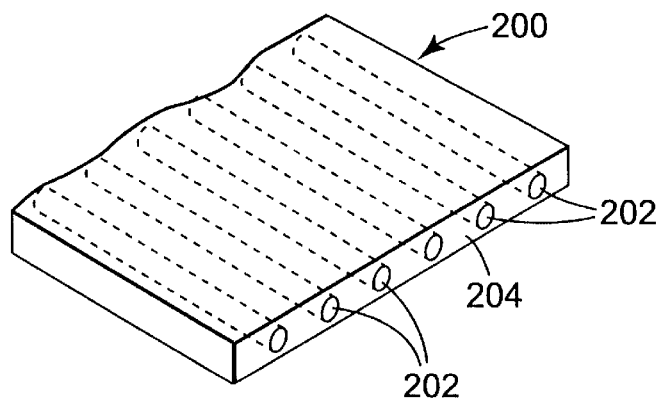
FIG. 4 is a perspective drawing of an article featuring a foam combined with an additional polymer composition.
Figure 5:
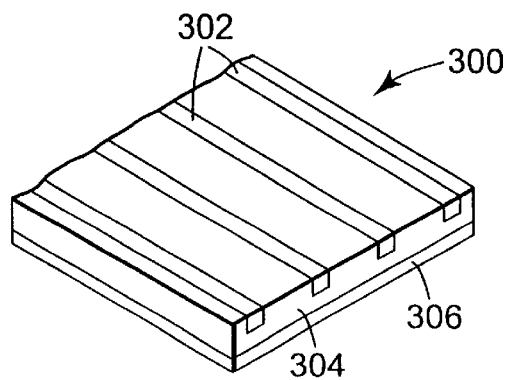
FIG. 5 is a perspective drawing of an article featuring a foam combined with two additional polymer compositions.
Figure 6:
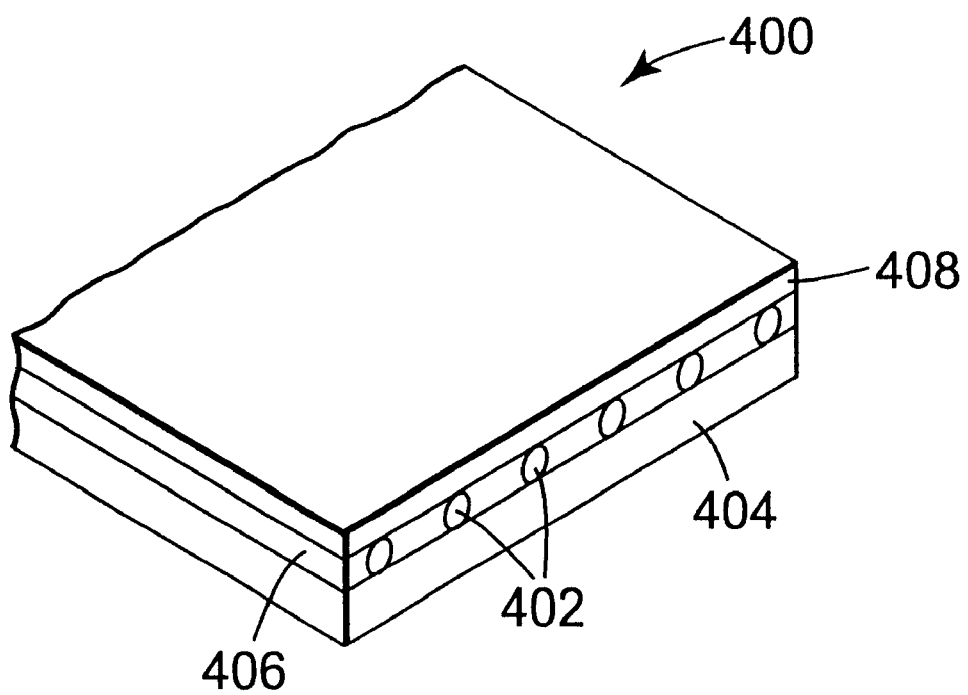
FIG. 6 is a perspective drawing of an article featuring a foam combined with multiple additional polymer compositions.

Examples of articles featuring combinations of a foam and one or more additional polymer compositions are shown in FIGS. 4–6. Referring to FIG. 4, there is shown an article 200 featuring a plurality of foam stripes 202 arranged in a patterned and combined within a separate polymer layer 204. The density of stripes 202 is different from the density of polymer layer 204 surrounding the stripes.

FIG. 5 depicts another article 300 in which a plurality of foam stripes 302 are arranged in a pattern and combined within a separate polymer layer 304. Layer 304, in turn, is bonded to yet another polymer layer 306 on its opposite face. The density of stripes 302 is different from the density of layer 304 surrounding the stripes.

FIG. 6 depicts yet another article 400 in which a plurality of foam stripes 402 are embedded within a multilayer structure featuring polymer layers 404, 406, and 408. The density of stripes 402 is different from the density of layers 404, 406, and 408.

Preferably, additional polymer compositions are bonded to the foam core by co-extruding the extrudable microsphere-containing composition with one or more extrudable polymer compositions, as described in greater detail, below. The number and type of polymer compositions are selected based upon the desired properties of the final foam-containing article. For example, in the case of non-adhesive foam cores, it may be desirable to combine the core with one or more adhesive polymer compositions to form an adhesive article. Other examples of polymer compositions prepared by co-extrusion include relatively high modulus polymer compositions for stiffening the article (semi-crystalline polymers such as polyamides and polyesters), relatively low modulus polymer compositions for increasing the flexibility of the article (e.g., plasticized polyvinyl chloride), and additional foam compositions.

Extrusion Process

Figure 7:
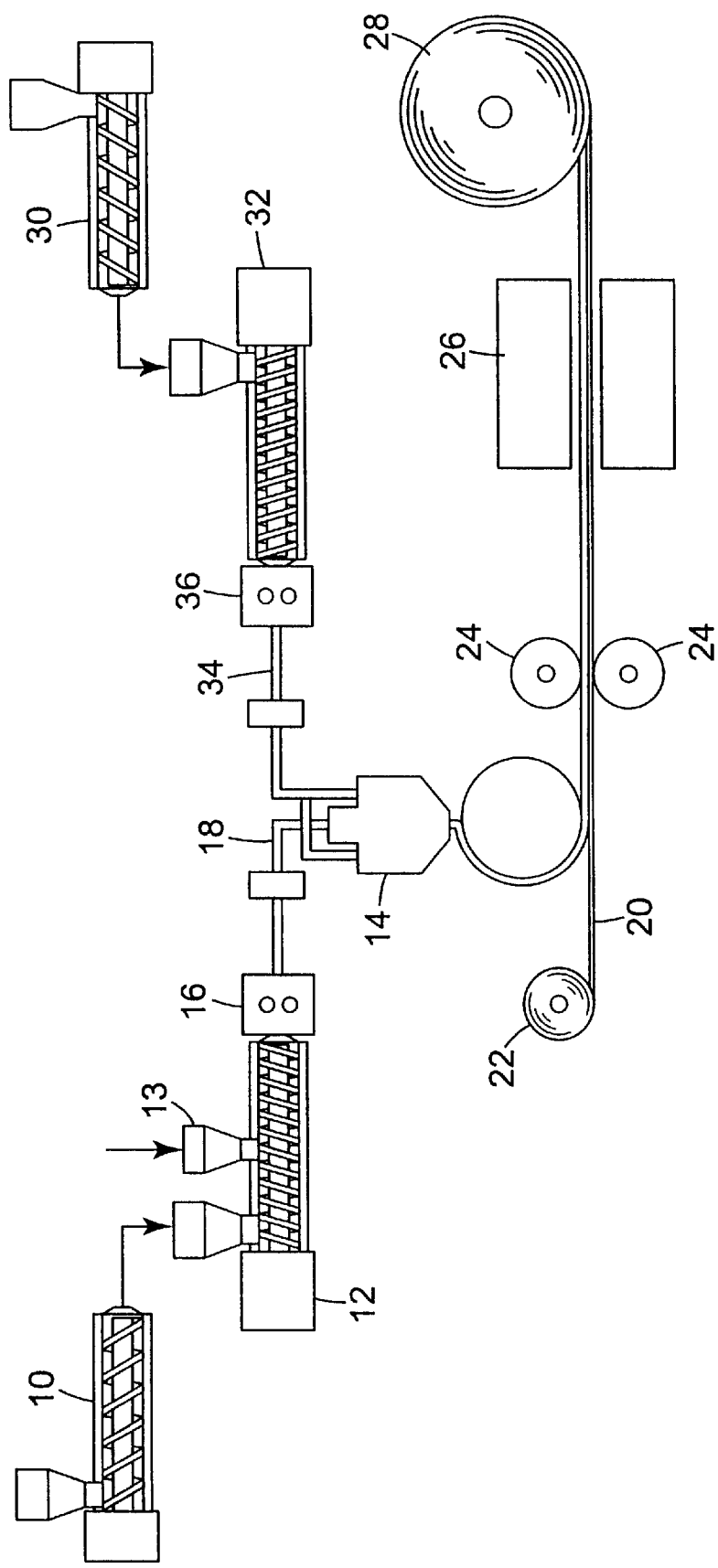
FIG. 7 is a schematic drawing of an extrusion process for preparing articles according to the invention.
Figure 8:
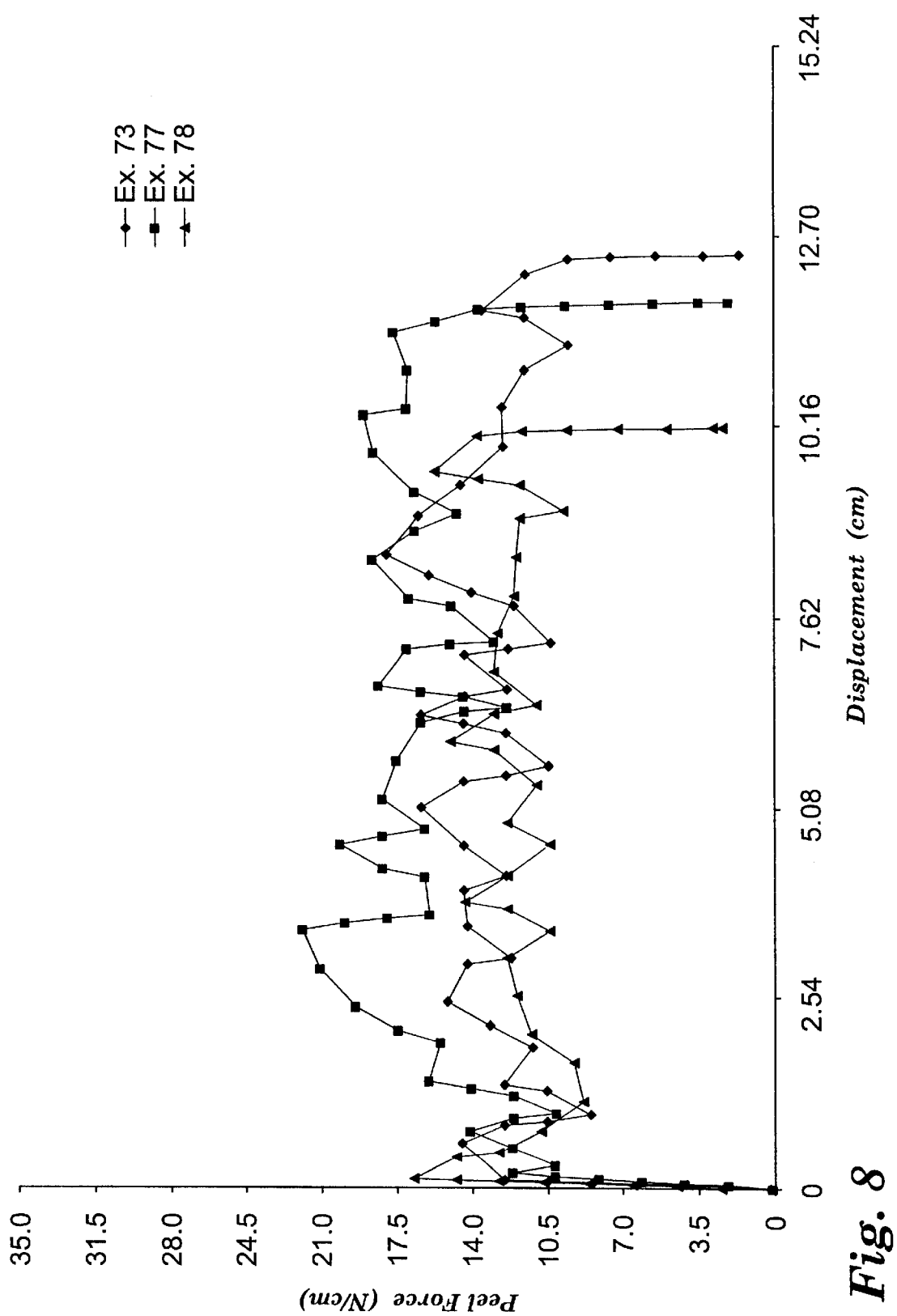
FIG. 8 is a plot showing the peel force applied in a direction (MD) parallel to the filament direction as a function of displacement for Examples 73, 77 and 78.
Figure 9:
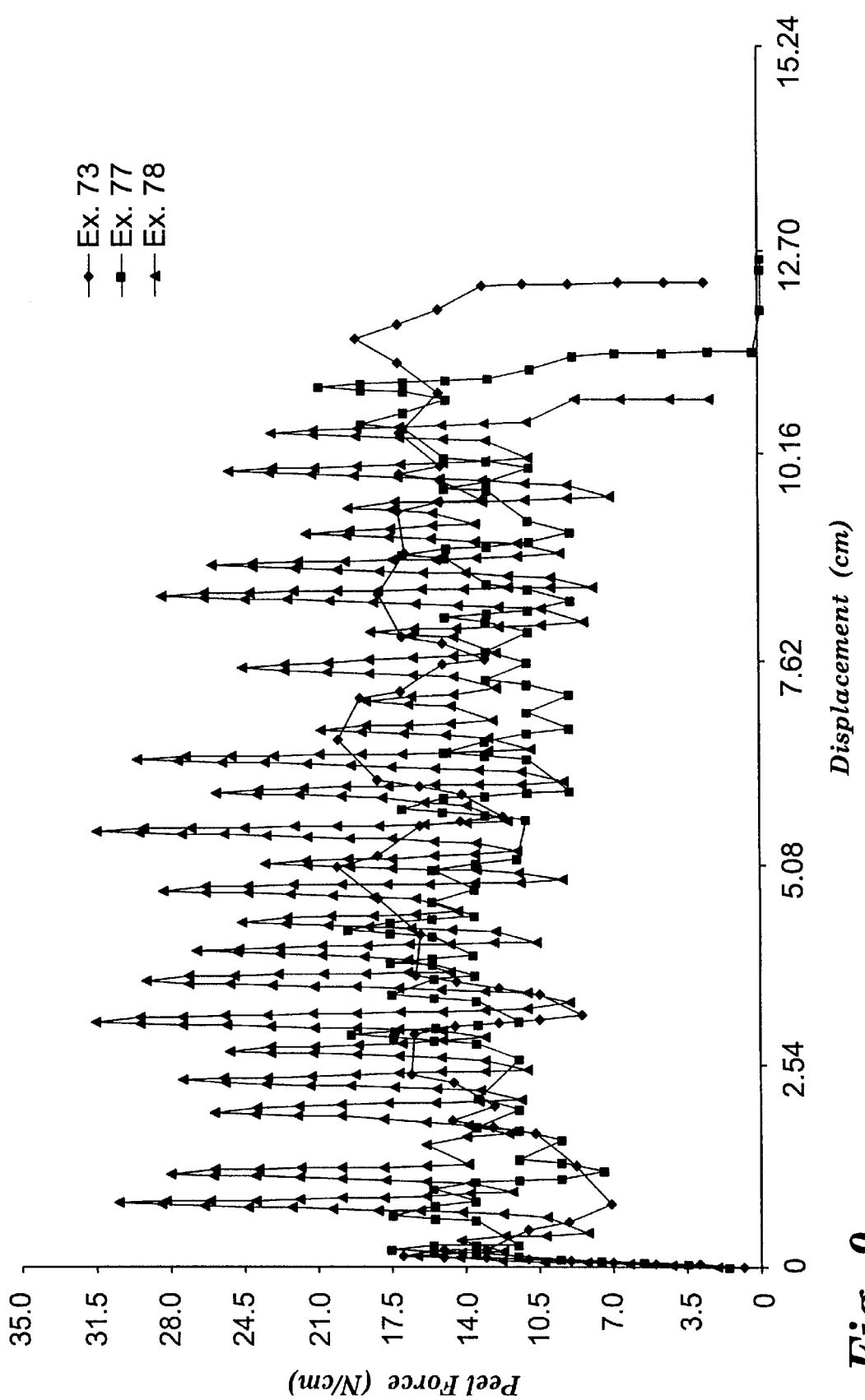
FIG. 9 is a plot showing the peel force applied in a direction (CD) perpendicular to the filament direction as a function of displacement for Examples 73, 77 and 78.
Figure 10:
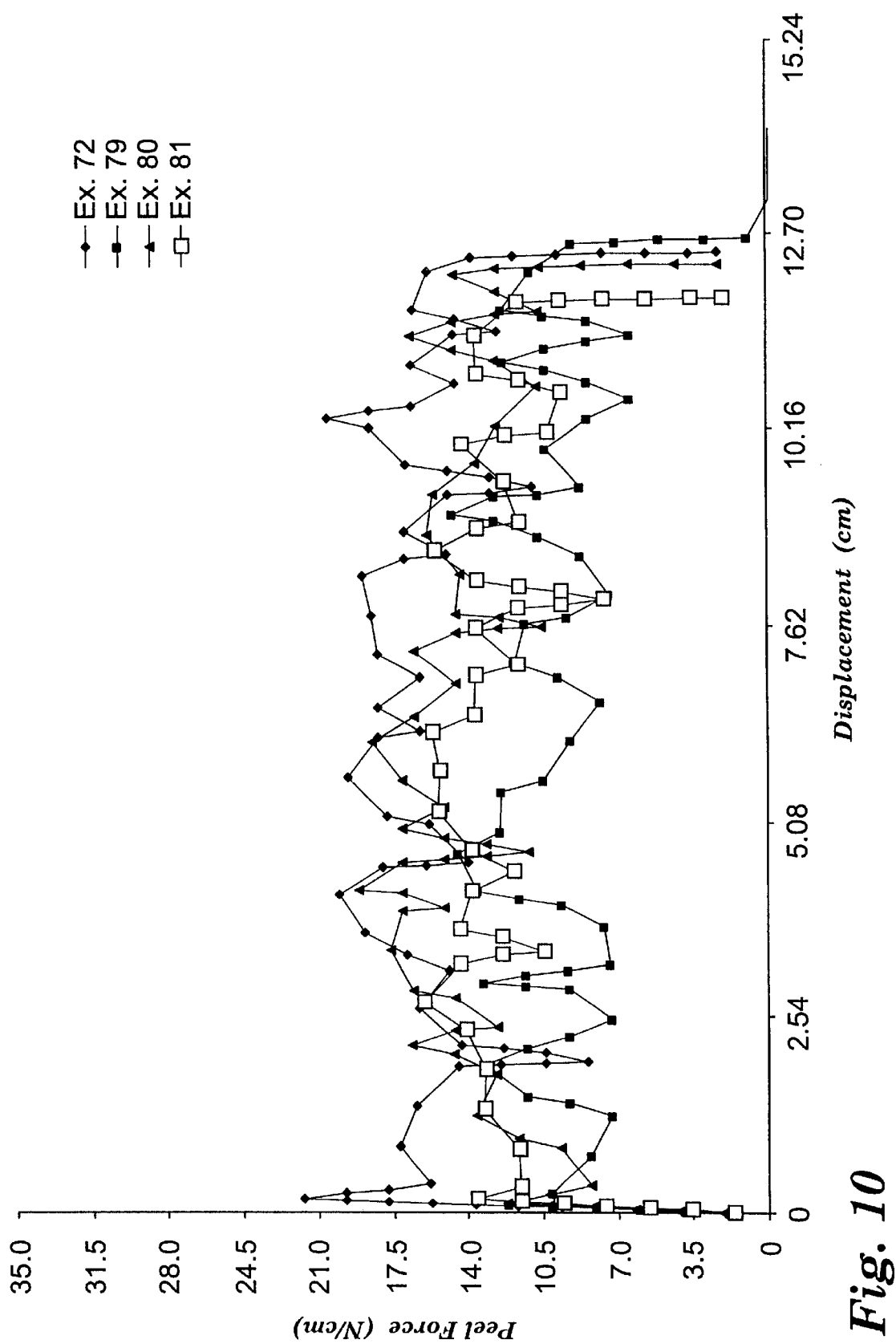
FIG. 10 is a plot showing the peel force applied in a direction (MD) parallel to the filament direction as a function of displacement for Examples 72, 79, 80 and 81.
Figure 11:
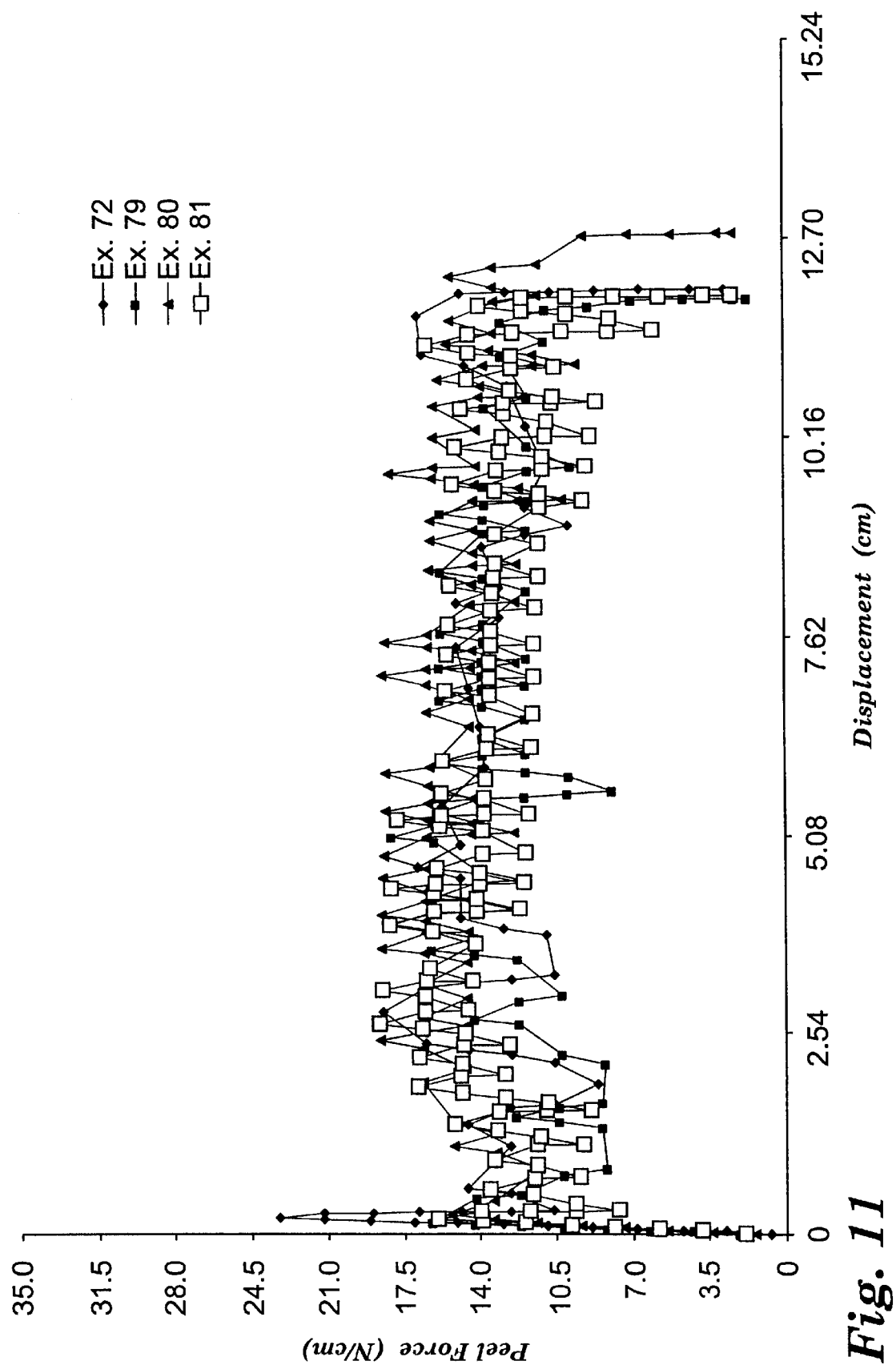
FIG. 11 is a plot showing the peel force applied in a direction (CD) perpendicular to the filament direction as a function of displacement for Examples 72, 79, 80 and 81.

Referring to FIG. 7, there is shown an extrusion process for preparing an article that includes a polymer foam featuring a polymer matrix and one or more expandable polymer microspheres. According to the process, polymer resin is initially fed into a first extruder 10 (typically a single screw extruder) which softens and grinds the resin into small particles suitable for extrusion. The polymer resin will eventually form the polymer matrix of the foam. The polymer resin may be added to extruder 10 in any convenient form, including pellets, billets, packages, strands, and ropes.

Next, the resin particles and all additives except the expandable microspheres are fed to a second extruder 12 (e.g., a single or twin screw extruder) at a point immediately prior to the kneading section of the extruder. Once combined, the resin particles and additives are fed to the kneading zone of extruder 12 where they are mixed well. The mixing conditions (e.g., screw speed, screw length, and temperature) are selected to achieve optimum mixing. Preferably, mixing is carried out at a temperature insufficient to cause microsphere expansion. It is also possible to use temperatures in excess of the microsphere expansion temperature, in which case the temperature is decreased following mixing and prior to adding the microspheres.

Where no mixing is needed, e.g., where there are no additives, the kneading step may be omitted. In addition, where the polymer resin is already in a form suitable for extrusion, the first extrusion step may be omitted and the resin added directly to extruder 12.

Once the resin particles and additives have been adequately mixed, expandable polymeric microspheres are added to the resulting mixture and melt-mixed to form an expandable extrudable composition. The purpose of the melt-mixing step is to prepare an expandable extrudable composition in which the expandable polymeric microspheres and other additives, to the extent present, are distributed substantially homogeneously throughout the molten polymer resin. Typically, the melt-mixing operation uses one kneading block to obtain adequate mixing, although simple conveying elements may be used as well. The temperature, pressure, shear rate, and mixing time employed during melt-mixing are selected to prepare this expandable extrudable composition without causing the microspheres to expand or break; once broken, the microspheres are unable to expand to create a foam. Specific temperatures, pressures, shear rates, and mixing times are selected based upon the particular composition being processed.

Following melt-mixing, the expandable extrudable composition is metered into extrusion die 14 (e.g., a contact or drop die) through a length of transfer tubing 18 using a gear pump 16 that acts as a valve to control die pressure and thereby prevent premature expansion of the microspheres. The temperature within die 14 is preferably maintained at substantially the same temperature as the temperature within transfer tubing 18, and selected such that it is at or above the temperature required to cause expansion of the expandable microspheres. However, even though the temperature within tubing 18 is sufficiently high to cause microsphere expansion, the relatively high pressure within the transfer tubing prevents them from expanding. Once the composition enters die 14, however, the pressure drops. The pressure drop, coupled with heat transfer from the die, causes the microspheres to expand and the composition to foam within the die. The pressure within the die continues to drop further as the composition approaches the exit, further contributing to microsphere expansion within the die. The flow rate of polymer through the extruder and the die exit opening are maintained such that as the polymer composition is processed through the die, the pressure in the die cavity remains sufficiently low to allow expansion of the expandable microspheres before the polymer composition reaches the exit opening of the die.

The shape of the foam is dictated by the shape of the exit opening of the die 14. Although a variety of shapes may be produced, the foam is typically produced in the form of a continuous or discontinuous sheet. The extrusion die may be a drop die, contact die, profile die, annular die, or a casting die, for example, as described in *Extrusion Dies: Design & Engineering Computation*, Walter Michaelis, Hanser Publishers, New York, N.Y., 1984, which is incorporated herein by reference in its entirety.

It can be preferable for most, if not all, of the expandable microspheres to be partially or mostly expanded before the polymer composition exits the die. By causing expansion of the expandable polymeric microspheres before the composition exits the die, the resulting extruded foam can be produced to within tighter density and thickness (caliper) tolerances. A tighter tolerance is defined as the machine (or longitudinal) direction and crossweb (or transverse) direction standard deviation of density or thickness over the average density or thickness ($\sigma/x$), respectively. The $\sigma/x$ that is obtainable according to the present invention can be less than about 0.2, less than about 0.1, less than about 0.05, and even less than about 0.025. Without any intention to be so limited, the tighter tolerances obtainable according to the present invention is evidenced by the following examples.

As shown in FIG. 7, the foam may optionally be combined with a liner 20 dispensed from a feed roll 22. Suitable materials for liner 20 include silicone release liners, polyester films (e.g., polyethylene terephthalate films), and polyolefin films (e.g., polyethylene films). The liner and the foam are then laminated together between a pair of nip rollers 24. Following lamination or after being extruded but before lamination, the foam is optionally exposed to radiation from an electron beam source 26 to crosslink the foam; other sources of radiation (e.g., ion beam, thermal and ultraviolet radiation) may be used as well. Crosslinking improves the cohesive strength of the foam. Following exposure, the laminate is rolled up onto a take-up roll 28.

If desired, the smoothness of one or both of the foam surfaces can be increased by using a nip roll to press the foam against a chill roll after the foam exits die 14. It is also possible to emboss a pattern on one or both surfaces of the foam by contacting the foam with a patterned roll after it exits die 14, using conventional microreplication techniques, such as, for example, those disclosed in U.S. Pat. No. 5,897,930 (Calhoun et al.), U.S. Pat. No. 5,650,215 (Mazurek et al.) and the PCT Patent Publication No. WO 98/29516A (Calhoun et al.), all of which are incorporated herein by reference. The replication pattern can be chosen from a wide range of geometrical shapes and sizes, depending on the desired use of the foam. The substantially smooth surface of the extruded foam enables microreplication of the foam surface to a higher degree of precision and accuracy. Such high quality microreplication of the present foam surface is also facilitated by the ability of the foam to resist being crushed by the pressure exerted on the foam during the microreplication process. Microreplication techniques can be used without significantly crushing the foam because the foam includes expandable microspheres that do not collapse under the pressure of the microreplication roll, compared to foaming agents like gas.

The extrusion process may be used to prepare "foam-in-place" articles. Such articles find application, for example, as gaskets or other gap-sealing articles, vibration damping articles, tape backings, retroreflective sheet backings, anti-fatigue mats, abrasive article backings, raised pavement marker adhesive pads, etc. Foam-in-place articles may be prepared by carefully controlling the pressure and temperature within die 14 and transfer tubing 18 such that microsphere expansion does not occur to any appreciable extent. The resulting article is then placed in a desired area, e.g., a recessed area or open surface and heated at, or exposed to, a temperature sufficiently high to cause microsphere expansion.

Foam-in-place articles can also be prepared by incorporating a chemical blowing agent such as 4,4'-oxybis(benzenesulfonylhydrazide) in the expandable extrudable composition. The blowing agent can be activated subsequent to extrusion to cause further expansion, thereby allowing the article to fill the area in which it is placed.

The extrusion process can also be used to prepare patterned foams having areas of different densities. For example, downstream of the point at which the article exits the die, the article can be selectively heated, e.g., using a patterned roll or infrared mask, to cause microsphere expansion in designated areas of the article.

The foam may also be combined with one or more additional polymer compositions, e.g., in the form of layers, stripes, rods, etc., preferably by co-extruding additional extrudable polymer compositions with the microsphere-containing extrudable compositions. FIG. 7 illustrates one preferred co-extrusion process for producing an article featuring a foam sandwiched between a pair of polymer layers. As shown in FIG. 7, polymer resin is optionally added to a first extruder 30 (e.g., a single screw extruder) where it is softened and melt mixed. The melt mixed resin is then fed to a second extruder 32 (e.g., a single or twin screw extruder) where they are mixed with any desired additives. The resulting extrudable composition is then metered to the appropriate chambers of die 14 through transfer tubing 34 using a gear pump 36. The resulting article is a three-layer article featuring a foam core having a polymer layer on each of its major faces.

It is also possible to conduct the co-extrusion process such that a two-layer article is produced, or such that articles having more than three layers (e.g., 10–100 layers or more) are produced, by equipping die 14 with an appropriate feed block, or by using a multi-vaned or multi-manifold die. Tie layers, primers layers or barrier layers also can be included to enhance the interlayer adhesion or reduce diffusion through the construction. In addition, we also can improve the interlayer adhesion of a construction having multiple layers (e.g., A/B) of different compositions by blending a fraction of the A material into the B layer (A/AB). Depending on the degree of interlayer adhesion will dictate the concentration of A in the B layer. Multilayer foam articles can also be prepared by laminating additional polymer layers to the foam core, or to any of the co-extruded polymer layers after the article exits die 14. Other techniques which can be used include coating the extruded foam (i.e., extrudate) with stripes or other discrete structures.

Figure 12A:
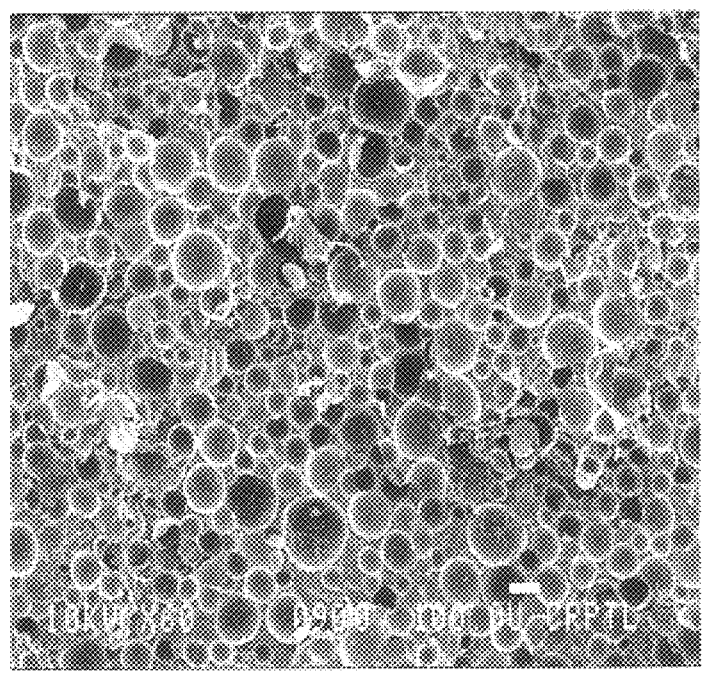
FIGS. 12a–12b are SEM photomicrographs of cross-sections, as viewed in the machine direction (MD) and crossweb direction (CD), respectively, of the unoriented foam described in Example 86.
Figure 12B:
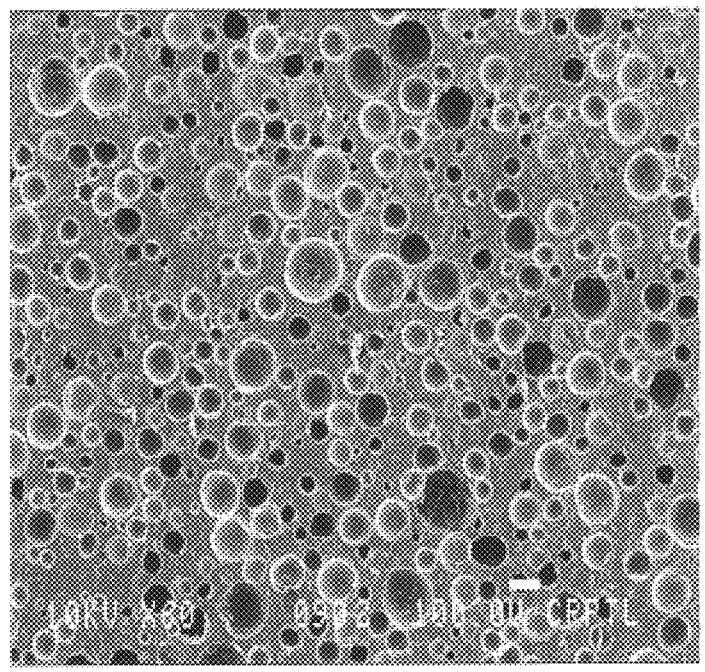
Figure 12C:
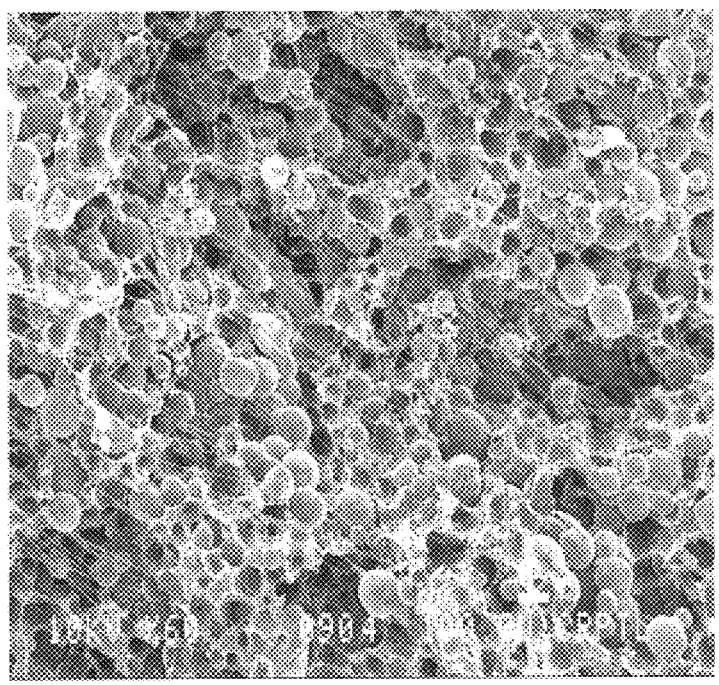
FIGS. 12c–12d are SEM photomicrographs of cross-sections, as viewed in the machine direction (MD) and crossweb direction (CD), respectively, of the axially oriented foam described in Example 86.
Figure 12D:
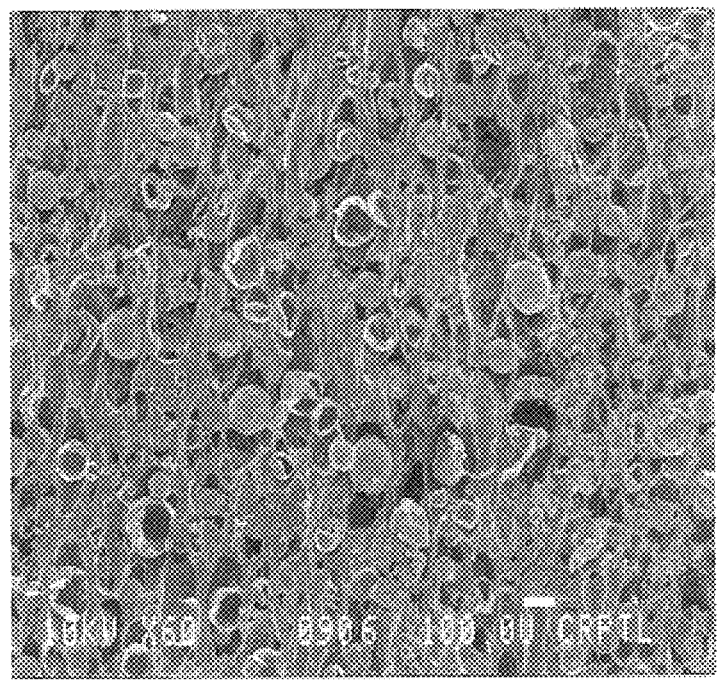

Post processing techniques, which may include lamination, embossing, extrusion coating, solvent coating, or orientation, may be performed on the foam to impart superior properties. The foams may be uni-axially or multi-axially oriented (i.e., stretched in one or more directions) to produce foam structures that contain microvoids between or a separation of the foam matrix and the expandable microspheres (See Examples 85–92). FIGS. 12a–12d show SEM micrographs of the microstructure of the foam of Example 86, before (FIGS. 12a and 12b) and after (FIGS. 12c and 12d) uniaxial orientation. FIGS. 12a and 12c are cross-sectional views of the foam microstructure as seen in the machine direction (MD). That is, for FIGS. 12a and 12c, the foam was sectioned perpendicular to the direction the foam flows as it exits the die and viewed in the direction of flow. FIGS. 12b and 12d are cross-sectional views of the foam microstructure as seen in the crossweb direction (CD). That is, for FIGS. 12b and 12d, the foam was sectioned parallel to the direction the foam flows as it exits the die and viewed in the direction perpendicular to the direction of flow.

The selection of the foam matrix, expandable microsphere type/concentration and orientation conditions can affect the ability to produce microvoided foam materials. Orientation conditions include the temperature, direction(s) of stretch, rate of stretch, and degree of stretch (i.e., orientation ratio). It is believed that the interfacial adhesion between the foam matrix and the expandable microspheres should be such to allow at least some debonding to occur around the microspheres upon stretching (i.e., orientation). It is also believed that poor interfacial adhesion can be preferable. Furthermore, it has be found desirable for the foam matrix to be capable of undergoing relatively high elongation (e.g., at least 100%). Orientation of the foam samples can cause a reduction in density of the foam (e.g., up to about 50%) due to the formation of microvoids between the foam matrix and the microspheres that form during orientation. Microvoids can remain after the stretching (orientation) process or they can disappear (i.e., collapse but the interface remains unbonded). In addition, delamination between the foam matrix and the microspheres, with or without a noticeable density reduction, can result in a significant alteration of the mechanical properties of the foam (e.g., increase in flexibility, reduction in stiffness, an increase in softness of foam, etc.). Depending on the ultimate foam application, the material selection and the orientation conditions can be selected to generate desired properties.

It can be desirable for the extrudable polymer composition to be crosslinkable. Crosslinking can improve the cohesive strength of the resulting foam. It may be desirable for the crosslinking of the extrudable polymer to at least start between the melt mixing step and exiting of the polymer through the die opening, before, during or after foaming, such as by the use of thermal energy (i.e., heat activated curing). Alternatively or additionally, the extrudable polymer composition can be crosslinked upon exiting the die such as, for example, by exposure to thermal, actinic, or ionizing radiation or combinations thereof. Crosslinking may also be accomplished by using chemical crosslinking methods based on ionic interactions. The degree of crosslinking can be controlled in order to influence the properties of the finished foam article. If the extruded polymer is laminated, as described herein, the polymer extrudate can be crosslinked before or after lamination. Suitable thermal crosslinking agents for the foam can include epoxies and amines. Preferably, the concentrations are sufficiently low to avoid excessive crosslinking or gel formation before the composition exits the die.

Use

The foam-containing articles are useful in a variety of applications including, for example and not by way of limitation, aerospace, automotive, and medical applications. The properties of the articles are tailored to meet the demands of the desired applications. Specific examples of applications include vibration damping articles, medical dressings, tape backings, retroreflective sheet backings, antifatigue mats, abrasive article backings, raised pavement marker adhesive pads, gaskets, sealants, signs, name plates, plaques, appliances, etc.

Other embodiments are within the following claims.

What is claimed is:

1. A pressure sensitive adhesive having a rubber phase, said adhesive comprising:
   (a) 100 parts by weight of a polymodal asymmetric elastomeric block copolymer;
   (b) at least one midblock-compatible tackifier in an amount sufficient to raise the calculated Fox $T_g$ of the rubber phase of said adhesive to greater than 245° K;
   (c) 0 to about 50 parts by weight of a crosslinking agent; and
   (d) 0 to about 300 parts by weight of a plasticizer;
      wherein said polymodal asymmetric elastomeric block copolymer has the formula $Q_nY$ and comprises from about 4 to about 40 percent by weight of a polymerized monovinyl aromatic compound and from about 96 to about 60 percent by weight of polymerized conjugated diene, wherein:
      Q represents an individual arm of said block copolymer and has the formula S—B;
      n represents the number of arms Q in said block copolymer and is a whole number of at least 3; and
      Y is the residue of a multifunctional coupling agent; and further wherein:
   (a) S is a nonelastomeric polymer segment endblock of a polymerized monovinyl aromatic homopolymer, there being at least two different molecular weight endblocks in said copolymer, a higher molecular weight endblock and a lower molecular weight endblock, wherein:
      (i) the number average molecular weight of said higher molecular weight endblock $(Mn)_H$ is in the range of from about 5,000 to about 50,000;
      (ii) the number average molecular weight of said lower molecular weight endblock $(Mn)_L$ is in the range of from about 1,000 to about 10,000; and
      (iii) the ratio $(Mn)_H/(Mn)_L$ is at least 1.25; and
   (b) B is an elastomeric polymer segment midblock which connects each arm to the residue of a multifunctional coupling agent (Y) and comprises a polymerized conjugated diene or combination of conjugated dienes, and wherein a film of said adhesive about 5 mils thick exhibits a 180° peel adhesion high density of at least 80 N/dm.

2. The pressure sensitive adhesive according to claim 1, wherein said adhesive is solvent free with only up to a 20% solvent content.

3. The pressure sensitive adhesive according to claim 1, wherein the rubber phase of said adhesive has a calculated Fox $T_g$ of at least 250° K.

4. The pressure sensitive adhesive according to claim 1, wherein the rubber phase of said adhesive has a calculated Fox $T_g$ with an upper limit of less than 300° K.

5. The pressure sensitive adhesive according to claim 1, wherein a film of said adhesive about 5 mils thick exhibits a 180° peel adhesion on high density polyethylene of at least 100 N/dm.

6. The pressure sensitive adhesive according to claim 1, wherein said adhesive is in the form of a film.

7. The pressure sensitive adhesive according to claim 1, wherein said adhesive is in the form of a foam having at least one substantially smooth major surface having an Ra value less than about 75 micrometers, as measured by laser triangulation profilometry, and said foam comprises a plurality of microspheres, at least one of which is an expandable polymeric microsphere.

8. The pressure sensitive adhesive according to claim 1, wherein said adhesive is in the form of a foam having at least one substantially smooth major surface having an Ra value less than about 75 micrometers, as measured by laser triangulation profilometry, and said foam comprises a plurality of said expandable polymeric microspheres.

9. The pressure sensitive adhesive according to claim 8, wherein said foam is substantially free of broken polymeric microspheres.

10. The pressure sensitive adhesive of claim 1, wherein said adhesive exhibits a 90° peel adhesion on a low surface energy substrate of at least 50 N/dm.

11. The pressure sensitive adhesive of claim 10, wherein said adhesive exhibits a 90° peel adhesion on a low surface energy substrate of at least 75 N/dm.

12. The pressure sensitive adhesive of claim 1, wherein said tackifier is a low acidic or neutral tackifier.

13. The pressure sensitive adhesive of claim 1, wherein said tackifier has a $T_g$ in the range of from about −50° C. to about 200° C.

14. The pressure sensitive adhesive of claim 1, wherein said tackifier has a softening point of above 80° C.

15. The pressure sensitive adhesive of claim 1, wherein said at least one tackifier is selected from the group consisting of hydrogenated mixed aromatic tackifiers, aliphatic/aromatic hydrocarbon liquid tackifiers; napthenic oils, mineral oils, and a mixture of one or more thereof.

16. The pressure sensitive adhesive of claim 1, wherein said adhesive comprises in the range of from about 50 parts to about 350 parts by weight of said at least one tackifier.

17. The pressure sensitive adhesive of claim 1, wherein said adhesive comprises in the range of from about 70 parts to about 300 parts by weight of said at least one tackifier.

18. The pressure sensitive adhesive according to claim 1, wherein the polymodal asymmetric elastomeric block copolymer is crosslinked.

19. The pressure sensitive adhesive according to claim 18, wherein said adhesive is a radiation crosslinkable composition.

20. The pressure sensitive adhesive according to claim 1, wherein the adhesive has a plateau modulus $G_{0,PSA}$ less than $3 \times 10^6$ dyne/cm$^2$ (0.3 MPa) calculated according to the equation:

$$G_{0,PSA} = v_c^2 G_{0,c}$$

wherein $v_c$ represents the volume fraction of the rubber phase in a soft matrix phase comprising the rubber phase and tackifier(s), and $G_{0,c}$ is the modulus of the neat block copolymer.

21. The pressure sensitive adhesive according to claim 20, wherein the adhesive has a plateau modulus $G_{0,PSA}$ less than $10^6$ dyne/cm$^2$ (0.1 MPa).

22. The pressure sensitive adhesive according to claim 20, wherein the adhesive has a plateau modulus $G_{0,PSA}$ between $10^5$ (0.01 MPa) and $8 \times 10^5$ dyne/cm$^2$ (0.08 MPa).

23. The pressure sensitive adhesive according to claim 20, wherein the adhesive has a Fox $T_g$ greater than 250° K and less than 300° K.

24. The pressure sensitive adhesive according to claim 20, wherein the adhesive has a Fox $T_g$ greater than 255° K and less than 300° K.

25. The pressure sensitive adhesive according to claim 1, wherein the tackifier is an aliphatic tackifier.

* * * * *